(12) United States Patent
Thangarasa et al.

(10) Patent No.: US 11,979,834 B2
(45) Date of Patent: *May 7, 2024

(54) METHODS FOR REDUCING USER EQUIPMENT POWER CONSUMPTION IN PRESENCE OF WAKE-UP SIGNAL

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,855

(22) Filed: Jun. 15, 2022

(65) Prior Publication Data

US 2022/0312324 A1     Sep. 29, 2022

Related U.S. Application Data

(63) Continuation of application No. 17/044,889, filed as application No. PCT/SE2019/050305 on Apr. 3, 2019, now Pat. No. 11,395,228.

(Continued)

(51) Int. Cl.
*H04W 52/02*     (2009.01)
*H04W 24/10*     (2009.01)
(Continued)

(52) U.S. Cl.
CPC ....... *H04W 52/0229* (2013.01); *H04W 24/10* (2013.01); *H04W 52/0258* (2013.01);
(Continued)

(58) Field of Classification Search
CPC ............. H04W 52/0229; H04W 24/10; H04W 52/0258; H04W 68/005; H04W 76/27; H04W 76/28

See application file for complete search history.

(56) References Cited

U.S. PATENT DOCUMENTS

| | | | |
|---|---|---|---|
| 11,395,228 B2 * | 7/2022 | Thangarasa | H04W 24/10 |
| 2015/0139053 A1 | 5/2015 | Van Lieshout et al. | |
| 2019/0132749 A1 | 5/2019 | Wei et al. | |

FOREIGN PATENT DOCUMENTS

| | | |
|---|---|---|
| CN | 102907133 A | 1/2013 |
| CN | 104081834 A | 10/2014 |

(Continued)

OTHER PUBLICATIONS

3GPP, "3rd Generation Partnership Project; Technical Specification Group Radio Access Network; Evolved Universal Terrestrial Radio Access (E-UTRA); Requirements for support of radio resource management (Release 15)", 3GPP TS 36.133 V15.0.0, Sep. 2017, 1-69.

(Continued)

*Primary Examiner* — Diane D Mizrahi
(74) *Attorney, Agent, or Firm* — Murphy, Bilak & Homiller, PLLC

(57) ABSTRACT

A method in a user equipment (UE) (210, 1000, 1100) is disclosed. The method comprises determining (902) that a paging message has been received or that a radio resource control (RRC) state of the UE has changed. The method comprises using (904) a normal measurement mode (105) for a period of time after the paging message has been received or the RRC state of the UE has changed. The method comprises determining (906), based on one or more criteria being satisfied, to enter a relaxed measurement mode (110) after the period of time.

20 Claims, 16 Drawing Sheets

Related U.S. Application Data

(60) Provisional application No. 62/653,778, filed on Apr. 6, 2018.

(51) Int. Cl.
*H04W 68/00* (2009.01)
*H04W 76/27* (2018.01)
*H04W 76/28* (2018.01)

(52) U.S. Cl.
CPC ......... *H04W 68/005* (2013.01); *H04W 76/27* (2018.02); *H04W 76/28* (2018.02)

(56) References Cited

FOREIGN PATENT DOCUMENTS

| | | |
|---|---|---|
| EP | 0812119 A2 | 12/1997 |
| EP | 0812119 A3 | 7/1999 |
| EP | 3171628 A1 | 5/2017 |
| EP | 3389309 A1 | 10/2018 |
| RU | 2433571 C2 | 11/2011 |
| RU | 2632187 C1 | 10/2017 |
| WO | 2015123405 A1 | 8/2015 |
| WO | 2015172506 A1 | 11/2015 |
| WO | 2016065108 A1 | 4/2016 |
| WO | 2016175690 A1 | 11/2016 |
| WO | 2017123009 A1 | 7/2017 |
| WO | 2018156301 A1 | 8/2018 |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.6.0, Mar. 2018, pp. 1-50.

Unknown, Author, "Design of SS burst set and SS block index", ZTE, ZTE Microelectronics, 3GPP TSG RAN WG1 Meeting #88, R1-1701573, Athens, Greece, Feb. 13-17, 2017, 1-5.

Unknown, Author, "Discussion on synchronization procedure in NR", Sequans Communications, 3GPP TSG-RAN WG1 #88, R1-1701850, Athens, Greece, Feb. 13-17, 2017, 1-6.

Unknown, Author, "LS on wake-up signal", 3GPP TSG RAN WG1 Meeting 92; R1-1803150; Athens, Greece, Feb. 26-Mar. 2, 2018, pp. 1-2.

Unknown, Author, "Power consumption reduction for paging and connected-mode DRX for NB-IoT", 3GPP TSG-RAN WG1 #89; R1-1706887; Hangzhou, P.R. China, May 15-19, 2017, pp. 1-5.

Unknown, Author, "Remaining Issues of IDLE State Measurement", 3GPP TSG RAN WG2 Meeting #101; R2-1802003; Athens, Greece, Feb. 26-Mar. 2, 2018, pp. 1-2.

Unknown, Author, "Remaining issues on SCG failure handling", 3GPP TSG-RAN WG2 #99bis; R2-1711758, Oct. 9-13, 2017, pp. 1-6.

Unknown, Author, "Serving cell RRM relaxation for WUS-capable UE", 3GPP TSG-RAN WG4 #86; R4-1801960; Athens, Greece, Feb. 26-Mar. 2, 2018, pp. 1-4.

* cited by examiner

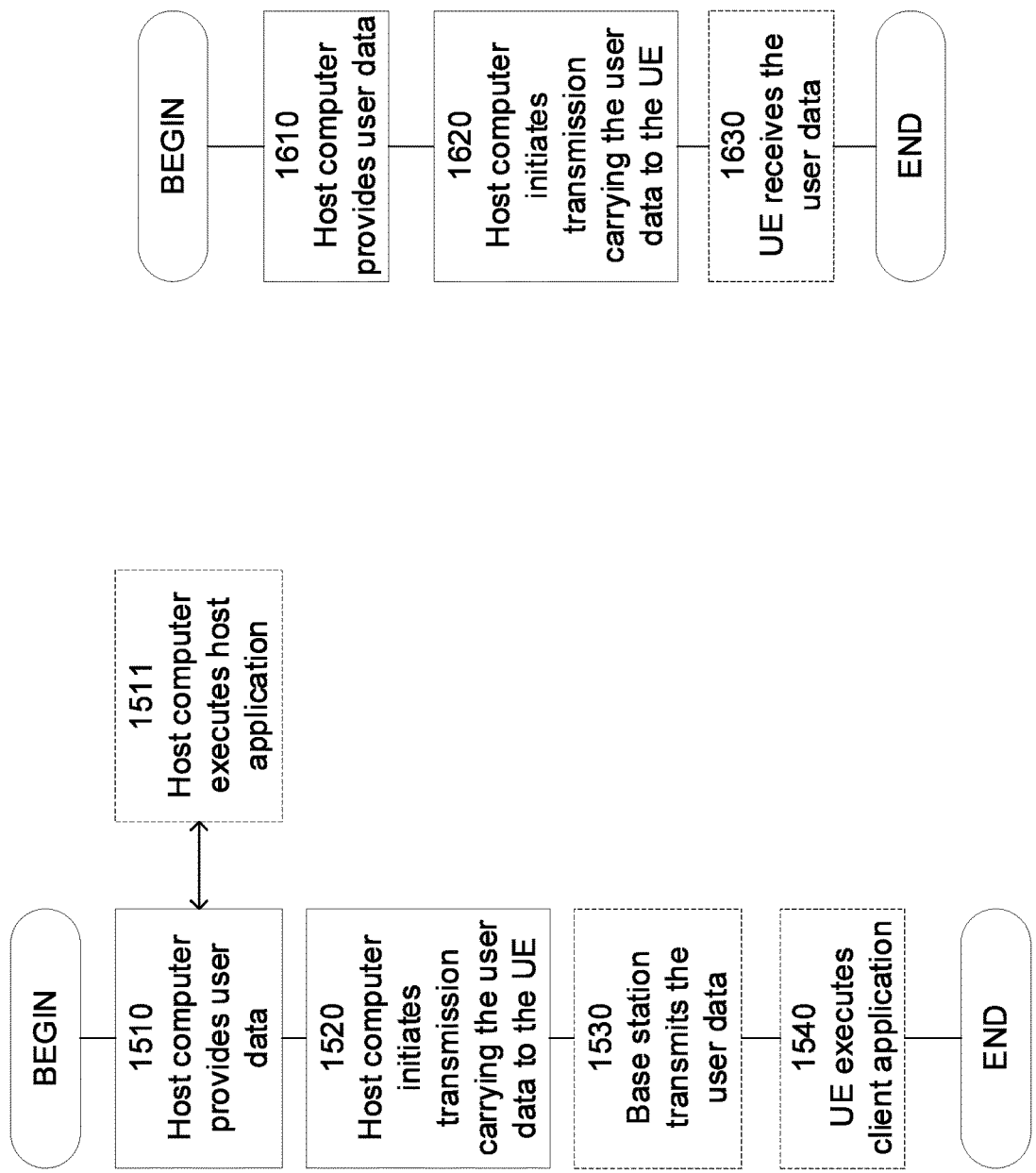

METHODS FOR REDUCING USER EQUIPMENT POWER CONSUMPTION IN PRESENCE OF WAKE-UP SIGNAL

TECHNICAL FIELD

The present disclosure relates, in general, to wireless communications and, more particularly, to methods for reducing user equipment power consumption in presence of wake-up signal.

BACKGROUND

Coverage enhancement techniques may be used in machine-type communication (MTC). These techniques are needed, in part, because the path loss between a machine-to-machine (M2M) device and a base station can be very large in some scenarios, such as when the M2M device is used as a sensor or metering device that is located in a remote location (e.g., in the basement of a building). In these types of scenarios, receiving signals from the base station can be very challenging. For example, the path loss can be worse than 20 decibels (dB) compared to normal operation.

In order to cope with these challenges, the coverage in uplink (UL) and/or in downlink (DL) has to be substantially enhanced. This is realized by employing one or more advanced techniques in the user equipment (UE) and/or in the network node for enhancing the coverage. Some non-limiting examples of such advanced techniques include: transmit power boosting; repetition of transmitted signal; applying additional redundancy to the transmitted signal; using an advanced/enhanced receiver; and any other suitable advanced techniques. In general, when employing these types of coverage enhancing techniques, the M2M device is considered to be operating in "coverage enhancing" mode.

A low complexity UE (e.g., a UE with 1 receiver (Rx)) may also be capable of supporting an enhanced coverage mode of operation.

UEs perform measurements (e.g., radio measurements) in Mobile Broadband (MBB) Long Term Evolution (LTE) and Narrowband Internet-of-Things (NB-IOT). Radio measurements done by the UE are typically performed on the serving cell(s), as well as on neighbour cells (e.g., Narrowband (NB) cells, NB Physical Resource Block (PRB), etc.) over some known reference symbols or pilot sequences (e.g., Narrowband Cell Specific Reference Signal (NB-CRS), Narrowband Secondary Synchronization Signal (NB-SSS), Narrowband Primary Synchronization Signal (NB-PSS), etc.). The measurements are done on cells on an intra-frequency carrier, inter-frequency carrier(s), as well as on inter-radio access technology (RAT) carriers(s) (depending upon the UE capability and whether it supports that RAT). To enable inter-frequency and inter-RAT measurements for UEs requiring gaps, the network has to configure the measurement gaps.

The measurements are done for various purposes. Some example measurement purposes include mobility, positioning, self-organizing network (SON), minimization of drive tests (MDT), operation and maintenance (O&M), and network planning and optimization, among others. Examples of measurements in LTE include cell identification (also referred to as Physical Cell Identity (PCI) acquisition), Reference Symbol Received Power (RSRP), Reference Symbol Received Quality (RSRQ), Cell Global Identity (CGI) acquisition, Reference Signal Time Difference (RSTD), UE RX-TX time difference measurement, and Radio Link Monitoring (RLM), among others. RLM entails both Out-of-Synchronization (out-of-sync) detection and In-Synchronization (in-sync) detection.

As another example, Channel State Information (CSI) measurements performed by the UE are used by the network for scheduling, link adaptation, and other suitable purposes. Examples of CSI measurements or CSI reports include Channel Quality Information (CQI), Precoding Matrix Indicator (PMI), Rank Indicator (RI), among others. CSI measurements may be performed on reference signals like Cell Specific Reference Signals (CRS), Channel State Information Reference Signals (CSI-RS), and/or Demodulation Reference Signals (DMRS).

In order to identify an unknown cell (e.g., a new neighbor cell), the UE has to acquire the timing of that cell and eventually the PCI. In legacy LTE operation, the DL subframe #0 and subframe #5 carry synchronization signals (e.g., both Primary Synchronization Signal (PSS) and Secondary Synchronization Signal (SSS)). The synchronization signals used for NB-IOT are known as NB-PSS and NB-SSS and their periodicity may be different from the LTE legacy synchronization signals.

This is referred to as cell search or cell identification. Subsequently, the UE also measures RSRP and/or RSRQ of the newly identified cell in order to use itself and/or report the measurement to a network node. In total, there are 504 PCIs in the NB-IoT RAT. The cell search is also a type of measurement. The measurements are done in all Radio Resource Control (RRC) states (e.g., in RRC idle and connected states). In RRC connected state, the measurements are used by the UE for one or more tasks (such as for reporting the results to the network node). In RRC idle state, the measurements are used by the UE for one or more tasks such as for cell selection, cell reselection, etc.

The objective of NB-IoT is to specify a radio access for cellular internet-of-things (IoT) based to a great extent on a non-backward-compatible variant of Evolved Universal Mobile Telecommunications System (UMTS) Terrestrial Radio Access (E-UTRA) that addresses improved indoor coverage, support for a massive number of low-throughput devices, low delay sensitivity, ultra-low device cost, low device power consumption and optimized network architecture.

The NB-IOT carrier bandwidth is 200 kilohertz (KHz). Examples of operating bandwidth of LTE are 1.4 megahertz (MHz), 3 MHz, 5 MHz, 10 MHz, 15 MHz, 20 MHz, etc.

NB-IoT supports 3 different deployment scenarios: stand-alone operation; guard-band operation; and in-band operation. Stand-alone operation utilizes, for example, the spectrum currently being used by GSM EDGE Radio Access Network (GERAN) systems as a replacement of one or more Global System for Mobile Communications (GSM) carriers. In principle, stand-alone operation operates on any carrier frequency that is neither within the carrier of another system nor within the guard band of another system's operating carrier. The other system can be another NB-IoT operation or any other RAT (e.g., LTE).

Guard-band operation utilizes the unused resource blocks (RBs) within an LTE carrier's guard band. The term guard band may also be referred to as guard bandwidth. As an example, in case of LTE bandwidth of 20 MHz (i.e., operating bandwidth equals 20 MHz or 100 RBs), the guard-band operation of NB-IoT can take place anywhere outside the central 18 MHz but within 20 MHz LTE bandwidth.

In-band operation utilizes RBs within a normal LTE carrier. The in-band operation may also be referred to as in-bandwidth operation. More generally, the operation of one RAT within the bandwidth of another RAT is also referred to as in-band operation. As an example, in a LTE bandwidth of 50 RBs (i.e., the operating bandwidth equals 10 MHz, or 50 RBs), NB-IoT operation over one RB within the 50 RBs is called in-band operation.

In NB-IoT, the DL transmission is based on Orthogonal Frequency Division Multiplexing (OFDM) with 15 kHz subcarrier spacing and the same symbol and cyclic prefix durations as legacy LTE for all the scenarios: stand-alone, guard-band, and in-band. For UL transmission, both multi-tone transmissions based with a 15 kHz subcarrier spacing on Single Carrier-Frequency Division Multiple Access (SC-FDMA) and single tone transmission with either 3.75 kHz or 15 kHz subcarrier spacing, are supported. This means that the physical waveforms for NB-IoT in DL and also partly in UL are similar to legacy LTE.

In the DL design, NB-IoT supports both master information broadcast and system information broadcast that are carried by different physical channels. For in-band operation, it is possible for NB-IoT UE to decode Narrowband Physical Broadcast Channel (NPBCH) without knowing the legacy physical resource block (PRB) index. NB-IoT supports both DL physical control channel (NPDCCH) and DL physical shared channel (NPDSCH). The operation mode of NB-IoT must be indicated to the UE. Currently, the $3^{rd}$ Generation Partnership Project (3GPP) considers indication by means of Narrowband Secondary Synchronization Signal (NSSS), Narrowband Master Information Block (NB-MIB), or perhaps other DL signals.

A "wake-up signal" (WUS) is based on the transmission of a short signal that indicates to the UE that it should continue to decode the DL control channel (e.g., full MTC Physical DL Control Channel (MPDCCH) (for eMTC) or NPDCCH (for NB-IoT)). If this signal is absent (e.g., because of discontinuous transmission (DTX)) and the UE does not detect it, then the UE can go back to sleep without decoding the DL control channel.

The decoding time for a WUS is considerably shorter than that of the full MPDCCH or NPDCCH. This in turn reduces UE power consumption and leads to longer UE battery life (for example as described in 3GPP TSG-RAN WG1 #89R1-1706887, "Power consumption reduction for paging and connected-mode DRX for NB-IoT", Hangzhou, P.R. China 15-19 May 2017). The WUS would be transmitted only when there is paging for the UE. If there is no paging for the UE, then the WUS will not be transmitted (i.e., implying DTX) and the UE would go back to sleep (e.g., upon detecting DTX instead of WUS).

There currently exist certain challenges. According to current specifications, the category NB1 UE is required to perform Narrowband RSRP (NRSRP) and Narrowband RSRQ (NRSRQ) measurement on the serving cell and evaluate the cell selection criterion at least every DRX cycle, as described in 3GPP TS 36.133:

The UE shall measure the NRSRP and NRSRQ level of the serving NB-IoT cell and evaluate the cell selection criterion S defined in [1] for the serving NB-IoT cell at least every DRX cycle.

The WUS signal that is being designed in RAN1 can have different mappings. One type of mapping is 1×1, which means there is a WUS signal transmitted prior to each paging occasion (PO). Another mapping which is also being considered is 1×N mapping, in which case one WUS signal is related to multiple POs. This mapping is not well aligned with current UE behavior in IDLE mode, which requires the UE to perform measurement and evaluate the serving cell criteria at least every discontinuous reception (DRX) cycle. Thus, it limits or reduces the power consumption gain that is achievable with 1×N mapping.

3GPP TSG RAN WG1 Meeting 92, R1-1803150, "LS on wake-up signal" (Athens, Greece, Feb. 26-Mar. 2, 2018) states that the relaxed Radio Resource Management (RRM) measurement apply at least for low-mobility UEs. However, determining the mobility state of the UE in the UE is a difficult task, and this shall be carefully considered when using that information for relaxing the RRM measurements. In 3GPP TSG-RAN WG4 #86, R4-1801960, "Serving cell RRM relaxation for WUS-capable UE" (Athens, Greece, 26 Feb.-2 Mar. 2018), a few examples were given of how the mobility state can be determined by analyzing the relative changes in the measurement. It is important to note that the measurement can vary for different reasons, and variation is not always associated with UE mobility. For example, radio conditions can change quickly over time, which can result in sudden dip or increase. It is for this reason that samples are filtered before they are used for operational tasks. Therefore, the relative changes in measurements are not reliable means to determine the mobility state of the UE.

SUMMARY

To address the foregoing problems with existing solutions, disclosed is a method in a user equipment (UE). The method comprises determining that a paging message has been received or that a radio resource control (RRC) state of the UE has changed. The method comprises using a normal measurement mode for a period of time after the paging message has been received or the RRC state of the UE has changed. The method comprises determining, based on one or more criteria being satisfied, to enter a relaxed measurement mode after the period of time.

In certain embodiments, the method may further comprise obtaining paging information indicating that the UE has been paged. The method may further comprise determining, based on the obtained paging information, that the paging message has been received. In certain embodiments, the obtained paging information may comprise one or more of: current paging information; and historical paging information.

In certain embodiments, the method may further comprise obtaining information about the RRC state of the UE. The information about the RRC state of the UE may indicate that the UE has been in a connected state. The method may further comprise determining that the RRC state of the UE has changed based on the obtained information about the RRC state of the UE. In certain embodiments, the obtained information about the RRC state of the UE may comprise one or more of: current RRC state information; and historical RRC state information.

In certain embodiments, the UE may be in an idle state while using the normal measurement mode for the period of time.

In certain embodiments, the method may further comprise determining, based on whether the one or more criteria are satisfied, whether to remain in the normal measurement mode or enter the relaxed measurement mode after the period of time.

In certain embodiments, the method may further comprise entering the relaxed measurement mode after the period of time. In certain embodiments, the normal measurement mode and the relaxed measurement mode may have different measurement requirements.

In certain embodiments, a duration of the period of time may be equal to a number of discontinuous reception cycles of the UE. In certain embodiments, the duration of the period of time may be predefined. In certain embodiments, the method may further comprise receiving an indication of the duration of the period of time from a network node.

In certain embodiments, a duration of the period of time may be based on whether the paging message has been received or the RRC state of the UE has changed. In certain embodiments, the period of time may have a first duration when the paging message has been received or the period of time may have a second duration when the RRC state of the UE has changed. The second duration may be different from the first duration.

Also disclosed is a user equipment (UE). The UE comprises a receiver, a transmitter, and processing circuitry coupled to the receiver and the transmitter. The processing circuitry is configured to determine that a paging message has been received or that a radio resource control (RRC) state of the UE has changed. The processing circuitry is configured to use a normal measurement mode for a period of time after the paging message has been received or the RRC state of the UE has changed. The processing circuitry is configured to determine, based on one or more criteria being satisfied, to enter a relaxed measurement mode after the period of time.

In certain embodiments, the processing circuitry may be configured to obtain paging information indicating that the UE has been paged. The processing circuitry may be configured to determine, based on the paging information, that the paging message has been received. In certain embodiments, the paging information may comprise one or more of: current paging information; and historical paging information.

In certain embodiments, the processing circuitry may be configured to obtain information about the RRC state of the UE. The information about the RRC state of the UE may indicate that the UE has been in a connected state. The processing circuitry may be configured to determine that the RRC state of the UE has changed based on the information about the RRC state of the UE. In certain embodiments, the information about the RRC state of the UE may comprise one or more of: current RRC state information; and historical RRC state information.

In certain embodiments, the processing circuitry may be configured to use the normal measurement mode for the period of time while the UE is in an idle state.

In certain embodiments, the processing circuitry may be configured to determine, based on whether the one or more criteria are satisfied, whether to remain in the normal measurement mode or enter the relaxed measurement mode after the period of time.

In certain embodiments, the processing circuitry may be configured to enter the relaxed measurement mode after the period of time. In certain embodiments, the normal measurement mode and the relaxed measurement mode may have different measurement requirements.

In certain embodiments, a duration of the period of time may be equal to a number of discontinuous reception cycles of the UE. In certain embodiments, the duration of the period of time may be predefined. In certain embodiments, the processing circuitry may be configured to receive an indication of the duration of the period of time from a network node.

In certain embodiments, a duration of the period of time may be based on whether the paging message has been received or the RRC state of the UE has changed. In certain embodiments, the period of time may have a first duration when the paging message has been received or the period of time may have a second duration when the RRC state of the UE has changed. The second duration may be different from the first duration.

Also disclosed is a computer program, the computer program comprising instructions configured to perform a method. The method comprises determining that a paging message has been received or that an RRC state of the UE has changed. The method comprises using a normal measurement mode for a period of time after the paging message has been received or the RRC state of the UE has changed. The method comprises determining, based on one or more criteria being satisfied, to enter a relaxed measurement mode after the period of time.

Also disclosed is a computer program product comprising a computer program, the computer program comprising instructions which when executed on a computer perform a method. The method comprises determining that a paging message has been received or that an RRC state of the UE has changed. The method comprises using a normal measurement mode for a period of time after the paging message has been received or the RRC state of the UE has changed. The method comprises determining, based on one or more criteria being satisfied, to enter a relaxed measurement mode after the period of time.

Also disclosed is a non-transitory computer-readable storage medium comprising a computer program, the computer program comprising instructions which when executed on a computer perform a method. The method comprises determining that a paging message has been received or that an RRC state of the UE has changed. The method comprises using a normal measurement mode for a period of time after the paging message has been received or the RRC state of the UE has changed. The method comprises determining, based on one or more criteria being satisfied, to enter a relaxed measurement mode after the period of time.

Certain embodiments of the present disclosure may provide one or more technical advantages. As one example, certain embodiments may advantageously increase power saving gain of UEs that are operating under coverage enhancement and/or low mobility. As another example, in certain embodiments the interworking between relaxed measurement mode and WUS may advantageously optimize the achievable power saving gain of WUS. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 15 is a flowchart of a method implemented in a communication system, in accordance with certain embodiments;

FIG. 16 is a flowchart of a method implemented in a communication system, in accordance with certain embodiments;

DETAILED DESCRIPTION

Figure 1:
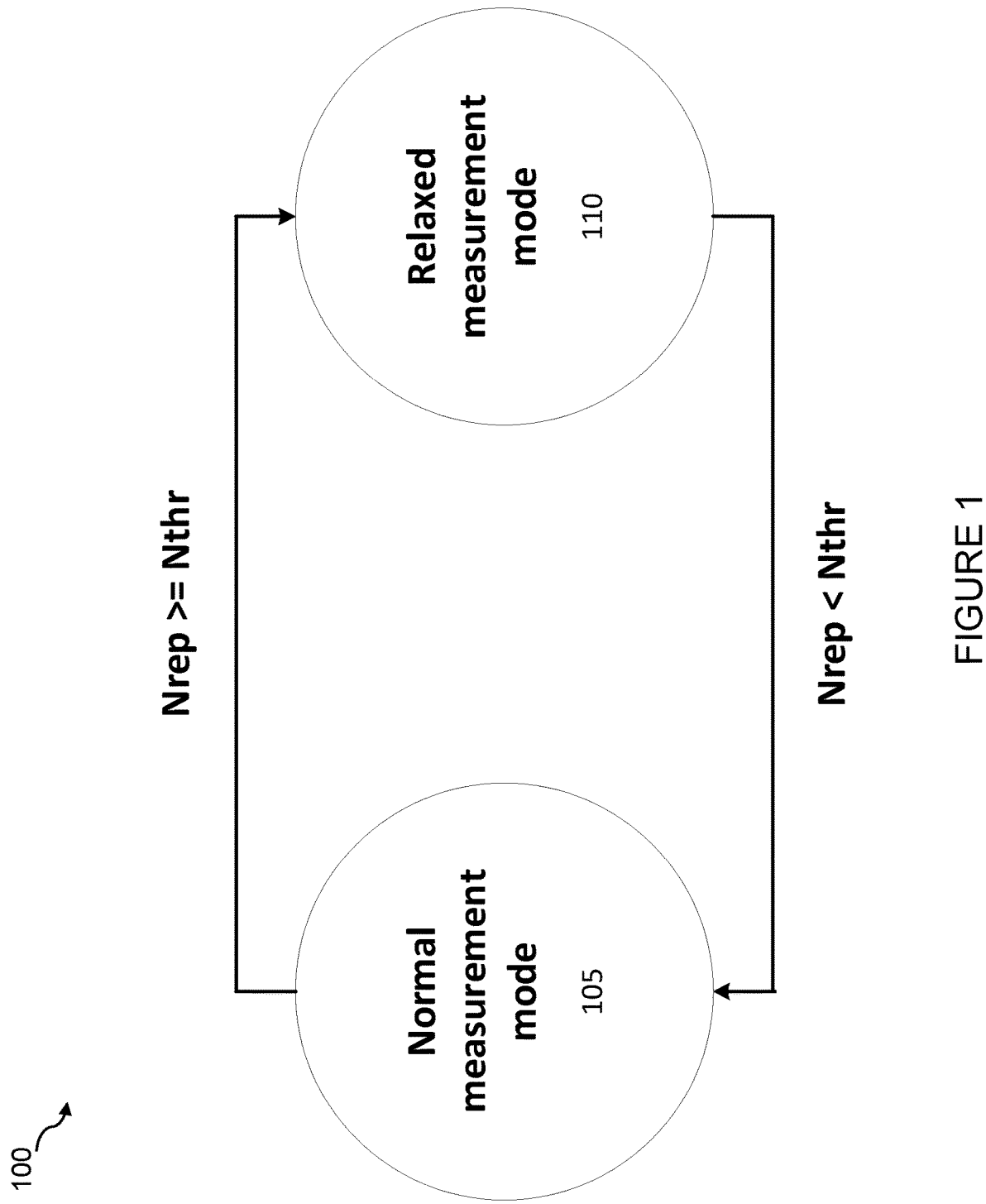
FIG. 1 is a diagram of a state machine illustrating the transition from normal measurement mode to relaxed measurement mode, and vice versa, in accordance with certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As described above, category NB1 UEs are required to perform NRSRP and NRSRQ measurements on the serving cell and evaluate the cell selection criterion at least every DRX cycle. The existing 1×N mapping of the WUS signal, in which one WUS signal is related to multiple POs, is not well aligned with current UE behavior in IDLE mode, which requires the UE to perform measurements and evaluate the serving cell criteria at least every DRX cycle. This limits or reduces the power consumption gain that is achievable with the 1×N mapping. Additionally, existing approaches to determining the mobility state of the UE rely on analyzing relative changes in the measurements. The measurements, however, can vary for different reasons, and the variation is not always associated with UE mobility. Thus, the relative changes in measurements are not a reliable means to determine the mobility state of the UE.

The present disclosure contemplates various embodiments that may address these and other deficiencies associated with existing approaches. For instance, the present disclosure contemplates various embodiments that may advantageously enable a UE to select one out of at least two measurement modes (e.g., a normal measurement mode and a relaxed measurement mode). In certain embodiments, the selection of the measurement mode may be performed according to which RRM measurements are performed. In certain embodiments, the selection of the measurement mode may be based on whether the UE has been paged and/or whether an RRC state of the UE has changed (e.g., from a connected state to an idle state).

According to one example embodiment, a method performed by a wireless device (e.g., a UE) is disclosed. The wireless device determines that a paging message has been received or that an RRC state of the wireless device has changed. For instance, the wireless device may obtain paging information indicating that the wireless device has been paged. The wireless device may determine, based on the obtained paging information, that the paging message has been received. As another example, the wireless device may obtain information about the RRC state of the wireless device. The information about the RRC state of the wireless device may indicate that the wireless device has been in a connected state. The wireless device may determine that the RRC state of the wireless device has changed based on the obtained information about the RRC state of the wireless device.

The wireless device uses a normal measurement mode for a period of time after the paging message has been received or the RRC state of the wireless device has changed. In certain embodiments, a duration of the period of time may be equal to a number of DRX cycles of the wireless device. In certain embodiments, the duration of the period of time may be predefined. In certain embodiments, the wireless device may receive an indication of the duration of the period of time from a network node. In certain embodiments, the wireless device may be in an idle state while using the normal measurement mode for the period of time.

The wireless device determines, based on one or more criteria being satisfied, to enter a relaxed measurement mode after the period of time. In certain embodiments, the normal measurement mode and the relaxed measurement mode may have different measurement requirements.

According to another example embodiment, a method performed by a wireless device is disclosed. The wireless device obtains information about a number of repetitions needed for decoding a control signal. The wireless device determines a relationship between the number of repetitions needed for decoding the control signal and a threshold value. The wireless device selects a measurement mode based on the relationship between the number of repetitions needed for decoding the control signal and the threshold value. In certain embodiments, the wireless device may perform one or more measurements according to the selected measurement mode.

Certain embodiments of the present disclosure may provide one or more technical advantages. As one example, certain embodiments may advantageously increase power saving gain of UEs that are operating under coverage enhancement and/or low mobility. As another example, in certain embodiments the interworking between relaxed measurement mode and WUS may advantageously optimize the achievable power saving gain of WUS. Other advantages may be readily apparent to one having skill in the art. Certain embodiments may have none, some, or all of the recited advantages.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 1 is a diagram of a state machine 100 illustrating the transition from normal measurement mode 105 to relaxed measurement mode 110, and vice versa, in accordance with certain embodiments. As shown in FIG. 1, a wireless device (e.g., a UE) can be in a first measurement mode (e.g., normal measurement mode 105) and switch to a second measurement mode (e.g., relaxed measurement mode 110) based on one or more criteria. In case multiple coverage levels are employed in the cell, the wireless device may select one out of multiple modes.

In the example of FIG. 1, the switching between normal measurement mode 105 and relaxed measurement mode 110 is based on actual control signal decoding information (e.g., a number of repetitions of NPDCCH, MPDCCH, WUS, etc.) used by the wireless device. As depicted in FIG. 1, if the required number of repetitions is larger than (or equal to) a certain threshold (e.g., Nrep>=Nthr), the wireless device enters relaxed measurement mode 110. In some cases, this can be an implicit indication that the wireless device is operating under coverage enhancement and that its mobility behavior is limited (e.g., always stationary or quasi-stationary). On the other hand, if the required number of repetitions to successfully decode the control signal is below that threshold (or a different threshold) (e.g., Nrep<Nthr), the wireless device enters the normal measurement mode 105. In some cases, this can be an implicit indication that the wireless device is operating under good coverage conditions and may also be relatively more mobile.

The measurement modes may have different requirements. For example, one difference between normal measurement mode 105 and relaxed measurement mode 110 may be that in relaxed measurement mode 110, the measurement requirements are relaxed (e.g., the measurement period is longer with respect to a reference period and/or measurement accuracies are relaxed with respect to reference accuracy level, etc.). In some cases, the relaxation of the measurement period can be realized by scaling the normal measurement mode period with a scaling factor. The scaling factor may depend on one or more factors, such as Rmax, WUS periodicity, and/or DRX configurations. One advantage of interworking between relaxed measurement mode and normal measurement mode is that it optimizes the achievable power saving gain of WUS.

Although FIG. 1 illustrates switching between normal measurement mode 105 and relaxed measurement mode 110 based on control signal decoding information, the present disclosure is not limited to this example embodiment. Rather, the present disclosure contemplates that a wireless device may select a measurement mode based on other suitable criteria. For instance, a wireless device may transition between normal measurement mode 105 and relaxed measurement mode 110 based on certain conditions of the wireless device. As one example, a wireless device that is under relaxed measurement mode can be paged any time. In certain embodiments, upon being paged the wireless device switches to normal measurement mode 105 for a certain time duration (e.g., $T_0$ ms, where $T_0=K*DRX$ cycles). After this period, the wireless device may evaluate (or re-evaluate) the criteria for enabling the relaxed measurement mode.

As another example, a wireless device that has been in relaxed measurement mode 110 earlier (e.g., while in an idle state, such as RRC_IDLE), may now be switching from a connected state (e.g., RRC_CONNECTED mode) to an idle state (e.g., RRC_IDLE mode). In certain embodiments, the wireless device shall remain in normal measurement mode 105 for a certain period of time (e.g., $T_1$ ms, where $T_1=L*DRX$ cycles). Thereafter, the wireless device may evaluation (or re-evaluate) the criteria for entering the relaxed measurement mode.

These and other example embodiments contemplated by the present disclosure are described in more detail below.

Figure 2:
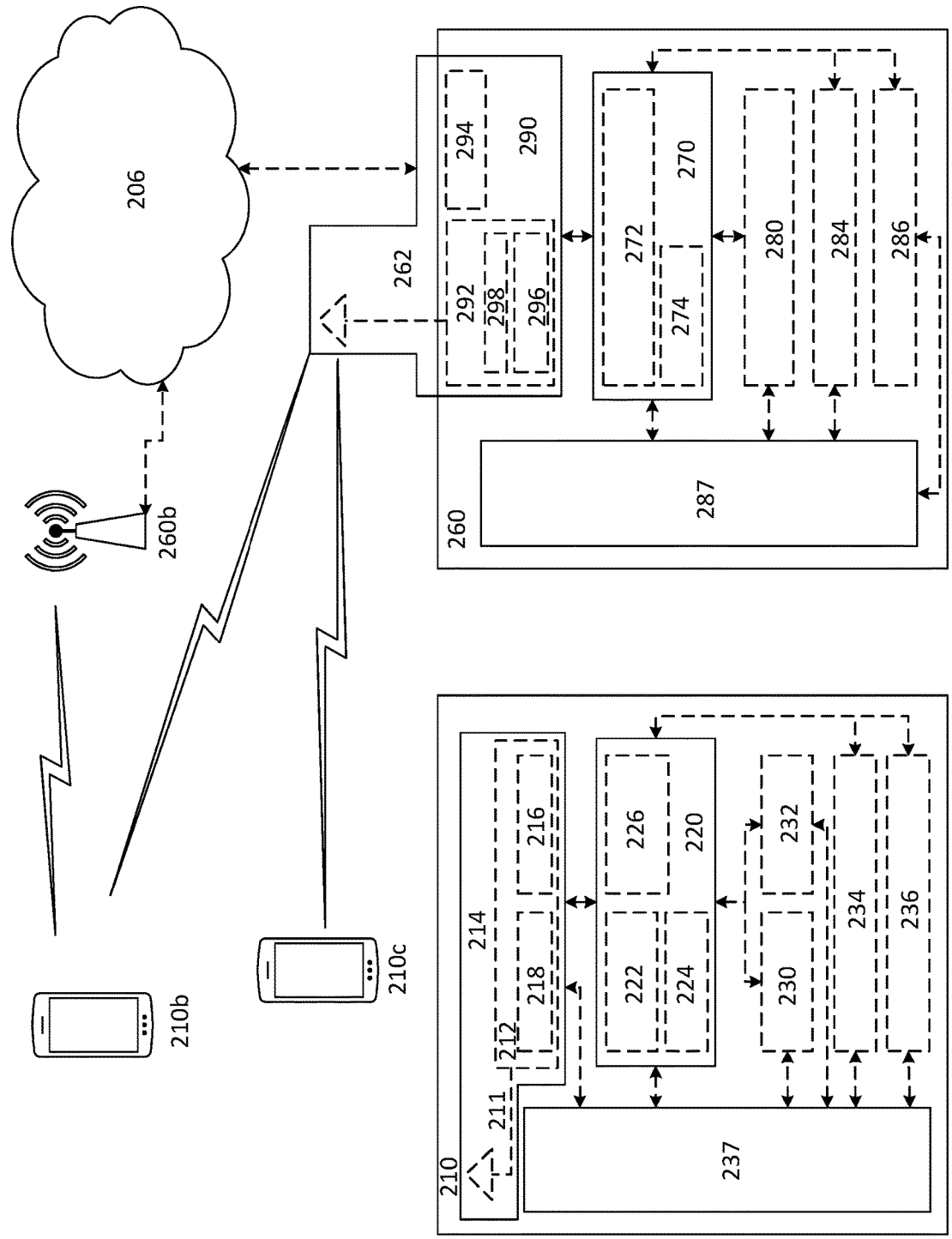
FIG. 2 illustrates an example wireless communications network, in accordance with certain embodiments.

FIG. 2 illustrates an example wireless communications network, in accordance with certain embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and wireless devices 210, 210b, and 210c. In practice, a wireless network may further include any additional elements suitable to support communication between wireless devices or between a wireless device and another communication device, such as a landline telephone, a service provider, or any other network node or end device. Of the illustrated components, network node 260 and wireless device 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and wireless device 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points) and base stations (BSs) (e.g., radio base stations, Node Bs, evolved Node Bs (eNBs), Master eNBs (MeNBs), Secondary eNBs (SeNBs), and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include a network node belonging to a Master Cell Group (MCG) or Secondary Cell Group (SCG), multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation and Maintenance (O&M) nodes, Operations Support System (OSS) nodes, self-organizing network (SON) nodes, positioning nodes (e.g., Evolved-Serving Mobile Location Centers (E-SMLCs)), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or wireless devices 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or wireless devices via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a radio communication device, a target device, a low-cost and/or low-complexity UE, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, USB dongles, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. Wireless device 210 may include multiple sets of one or more of the illustrated components for different wireless technologies supported by wireless device 210, such as, for example, GSM, WCDMA, LTE, NR, WiFi, WiMAX, or Bluetooth wireless technologies, just to mention a few. These wireless technologies may be integrated into the same or different chips or set of chips as other components within wireless device 210.

Antenna 211 may include one or more antennas or antenna arrays, configured to send and/or receive wireless signals, and is connected to interface 214. In certain alternative embodiments, antenna 211 may be separate from wireless device 210 and be connectable to wireless device 210 through an interface or port. Antenna 211, interface 214, and/or processing circuitry 220 may be configured to perform any receiving or transmitting operations described herein as being performed by a wireless device. Any information, data and/or signals may be received from a network node and/or another wireless device. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, wireless device 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or wireless devices via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 210 components, such as device readable medium 230, wireless device 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of wireless device 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a wireless device may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner In any of those particular embodiments, whether executing instructions stored on a device readable storage medium or not, processing circuitry 220 can be configured to perform the described functionality. The benefits provided by such functionality are not limited to processing circuitry 220 alone or to other components of wireless device 210, but are enjoyed by wireless device 210 as a whole, and/or by end users and the wireless network generally.

Processing circuitry 220 may be configured to perform any determining, calculating, or similar operations (e.g., certain obtaining operations) described herein as being performed by a wireless device. These operations, as performed by processing circuitry 220, may include processing information obtained by processing circuitry 220 by, for example, converting the obtained information into other information, comparing the obtained information or converted information to information stored by wireless device 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with wireless device 210. Such interaction may be of many forms, such as visual, audial, tactile, etc. User interface equipment 232 may be operable to produce output to the user and to allow the user to provide input to wireless device 210. The type of interaction may vary depending on the type of user interface equipment 232 installed in wireless device 210. For example, if wireless device 210 is a smart phone, the interaction may be via a touch screen; if wireless device 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into wireless device 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from wireless device 210, and to allow processing circuitry 220 to output information from wireless device 210. User interface equipment 232 may include, for example, a speaker, a display, vibrating circuitry, a USB port, a headphone interface, or other output circuitry. Using one or more input and output interfaces, devices, and circuits, of user interface equipment 232, wireless device 210 may communicate with end users and/or the wireless network, and allow them to benefit from the functionality described herein.

Auxiliary equipment 234 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. Wireless device 210 may further comprise power circuitry 237 for delivering power from power source 236 to the various parts of wireless device 210 which need power from power source 236 to carry out any functionality described or indicated herein. Power circuitry 237 may in certain embodiments comprise power management circuitry. Power circuitry 237 may additionally or alternatively be operable to receive power from an external power source; in which case wireless device 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of wireless device 210 to which power is supplied.

In certain embodiments, wireless device 210 may be configured with a Primary Cell (PCell) and Primary Secondary Cell (PSCell) or with PCell, PSCell and one or more Secondary Cells (SCells) such as in dual connectivity and/or carrier aggregation. The configured cells are wireless device specific (and are also known as serving cells of the wireless device).

The various embodiments described herein are applicable for a wireless device in a low- or in a high-activity state. Examples of low-activity states include RRC idle state, idle mode, RRC inactive state, etc. Examples of high-activity states include RRC CONNECTED state, active mode, active state, etc. In certain embodiments, wireless device 210 may be configured to operate in DRX or in non-DRX. If configured to operate in DRX, wireless device 210 may still operate according to non-DRX as long as it receives new transmissions from the network node.

Wireless device 210 may operate under normal coverage, extended coverage or extreme coverage with respect to its serving cell or the target cell on which a measurement is to be performed. These coverage classes may be referred to as normal coverage and enhanced coverage in some cases herein. Wireless device 210 may also operate in a plurality of coverage levels (e.g., normal coverage, enhanced coverage level 1, enhanced coverage level 2, enhanced coverage level 3, and so on). In certain embodiments, the coverage level may be expressed in terms of: received signal quality and/or received signal strength at wireless device 210 with respect to its serving cell; and/or received signal quality and/or received signal strength at the serving cell with respect to wireless device 210. Examples of signal quality include signal-to-noise ratio (SNR), signal-to-interference-plus-noise ratio (SINR), Channel Quality Indicator (CQI), RSRQ, CRS Ês/Iot, SCH Ês/Iot etc. Examples of signal strength include path loss, RSRP, SCH_RP, etc. The notation Ês/Iot is defined as ratio of Ês (which is the received energy per resource element (power normalized to the subcarrier spacing) during the useful part of the symbol, (i.e., excluding the cyclic prefix) at the wireless device antenna connector to Iot (which is the received power spectral density of the total noise and interference for a certain resource element (power integrated over the resource element and normalized to the subcarrier spacing) as measured at the UE antenna connector).

To illustrate, consider an example of 2 coverage levels defined with respect to signal quality (e.g., SNR) at wireless device 210 including: coverage enhancement level 1 (CE1) comprising SNR>−6 dB at wireless device 210 with respect to its serving cell; and coverage enhancement level 2 (CE2) comprising −12 dB<SNR<−6 dB at wireless device 210 with respect to its serving cell. Consider another example of 4 coverage levels including: coverage enhancement level 1 (CE1) comprising SNR>−6 dB at wireless device 210 with respect to its serving cell; coverage enhancement level 2 (CE2) comprising −12 dB<SNR<−6 dB at wireless device 210 with respect to its serving cell; coverage enhancement level 3 (CE3) comprising −15 dB<SNR<−12 dB at wireless device 210 with respect to its serving cell; and coverage enhancement level 4 (CE4) comprising −18 dB<SNR<−15 dB at wireless device 210 with respect to its serving cell. In the above examples, CE1 may be referred to as normal coverage level, baseline coverage level, reference coverage level, legacy coverage level, etc. On the other hand, CE2-CE4 may be referred to as enhanced coverage or extended coverage level.

As described above, certain embodiments may advantageously improve the power-saving gain of wireless device 210 in the presence of WUS in a serving cell. According to one example embodiment, wireless device 210 determines a measurement mode to enter (e.g., normal measurement mode 105 or relaxed measurement mode 110 described above in relation to FIG. 1) based on a relationship between the number of repetitions needed for decoding a control signal and one or more threshold values. As used herein, control signal refers to any physical control channel or any physical signal. A physical control channel comprises of a set of resource elements carrying information originating from higher layers (e.g., transport channel, RRC message, etc.). Examples of DL control channels include Physical Broadcast Channel (PBCH), Physical Downlink Control Channel (PDCCH), Narrowband PDCCH (NPDCCH), Enhanced Physical Downlink Control Channel (EPDCCH), MPDCCH, NPBCH etc. Examples of physical signals are WUS, Cell Specific Reference Signals (CRS), Narrowband Reference Signal (NRS), Narrowband Primary Synchronization Signal (NPSS), Narrowband Secondary Synchronization Signal (NSSS), etc.

As used herein, repetition of a signal refers to transmitting at least two transmitted signals in different time resources (e.g., in different subframes). As one example, the at least two transmitted signals may be identical. As another example, the at least two transmitted signals may be quasi-identical. In this case, their physical contents may be identical but their respective phases may be different (e.g., if transmitted using different antenna ports). Examples of signals include physical signals (e.g., CRS, PSS, SSS, NRS, NPSS, NSSS, WUS, etc.) and physical channels (e.g., PDCCH, ePDCCH, NPDCCH, MPDCCH, NPDSCH, PDSCH, PBCH, NPBCH, PUCCH, PUSCH, NPUCCH, NPUSCH, etc.). The UE decodes the signal (e.g., NPDCCH, WUS, etc.) transmitted with repetition after receiving first transmission of the signal and one or more retransmissions of the same signal.

According to one example embodiment, wireless device 210 obtains information about a number of repetitions needed for decoding a control signal. Wireless device 210 determines a relationship between the number of repetitions needed for decoding the control signal and a threshold value. Wireless device 210 selects a measurements mode based on the relationship between the number of repetitions needed for decoding the control signal and the threshold value. The steps and procedures that may be associated with this example embodiment are described in more detail below in relation to FIG. 3 (with continuing reference to the elements of FIG. 2).

Figure 3:
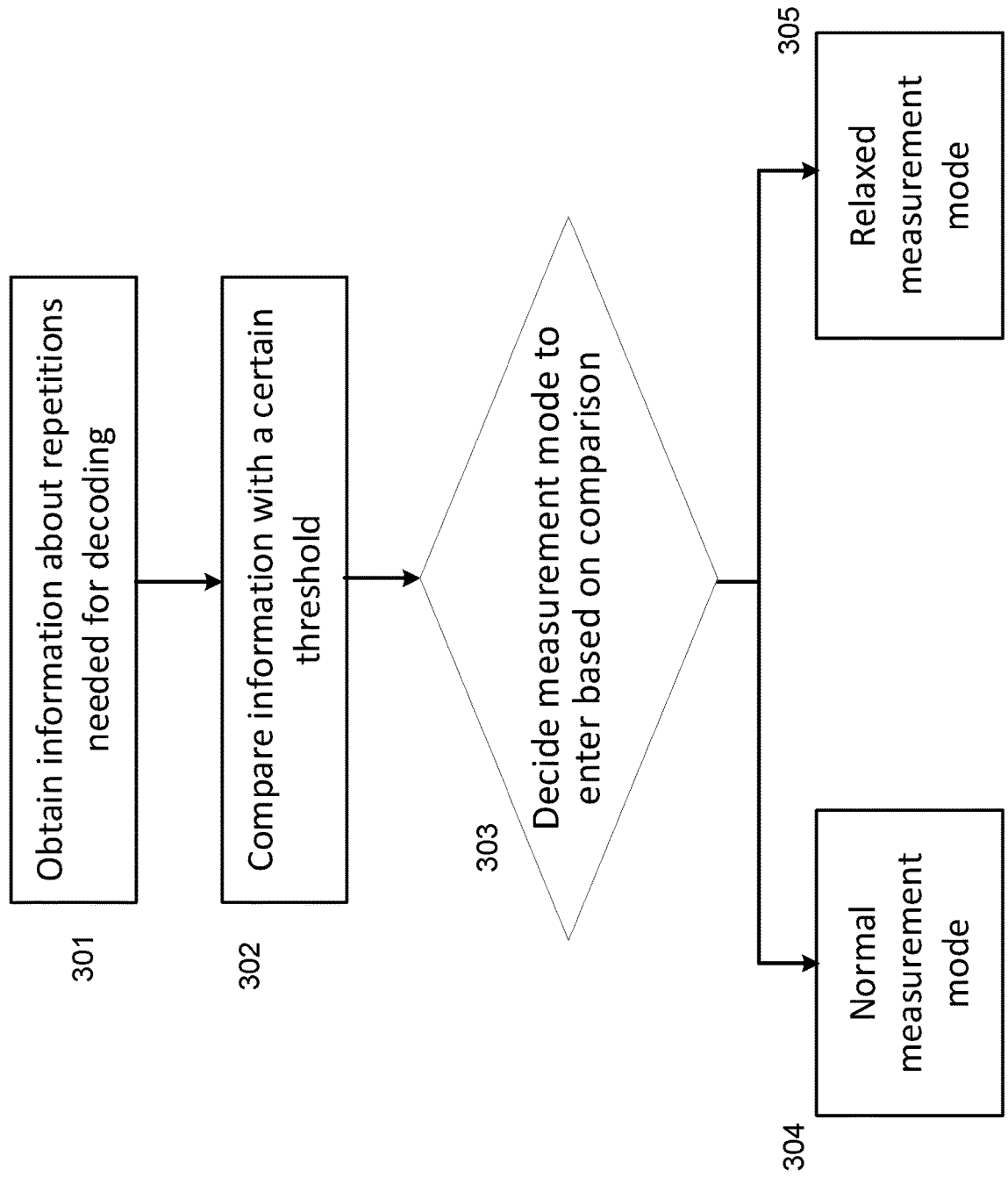
FIG. 3 is a flow diagram of a method in a wireless device, in accordance with certain embodiments.

FIG. 3 is a flow diagram of a method in a wireless device (e.g., wireless device 210 described above in relation to FIG. 2), in accordance with certain embodiments. At step 301, wireless device 210 obtains information about the repetition number or level of a control signal needed to successfully decode the control signal (e.g., WUS, NPDCCH, MPDCCH, PDCCH). The information may be obtained in any suitable manner In some cases, the obtained information may be explicit information (e.g., the required repetition is 8, 16, 64, 128, 256, etc.). In some cases, the obtained information may be implicit information with respect to a certain threshold (e.g., the required repetition level is less than a threshold value (e.g., Nthr−1) or the required repetition level is greater than or equal to the threshold value (e.g., Nthr−1). The threshold value may be a threshold used in wireless device 210 for comparison. In certain embodiments, the threshold value can be either configured or pre-defined or autonomously determined by wireless device 210.

In certain embodiments, the threshold value may further depend on the target block error rate (BLER) with which the control signal should be received at wireless device 210 (e.g., 1% BLER). In some cases, the obtained information about the repetition number or level may correspond to a repetition level/number required to achieve a certain BLER of a hypothetical control signal (e.g., NPDCCH, MPDCCH, PDCCH, WUS). In such a scenario, this involves wireless device 210 estimating the DL reference signal measurements (e.g., signal quality such as SNR, NRSRQ, SINR, etc.) and then comparing the results of the signal measurements to some threshold(s). The threshold(s) may be expressed in terms of signal quality (e.g., SNR, SINR, NRSRQ, or BLER, e.g., 1% hypothetical NPDDCH BLER).

In certain embodiments, the repetition level may be determined based on a pre-defined mapping table that maps the signal quality and base station transmission parameters, including repetition level of control signals such as NPDCCH, WUS, MPDCCH, etc. The pre-defined mapping table may be specified in a standard or, in some cases, it may be implementation specific for wireless device 210. From this table, wireless device 210 can determine the required repetition level that corresponds to a certain hypothetical BLER and use it to perform certain comparisons (as described in more detail below). This approach of using a mapping table to determine a repetition level of control signals can be used, for example, to avoid the decoding of the actual control channel. Additionally or alternatively, the approach of using a mapping table to determine a repetition level of control signals can be used when the control channel is transmitted or received by wireless device 210 very infrequently (e.g., on average once every Nth DRX cycle where, as an example, N>4 or larger).

In some cases, the repetition number or the number of repetitions with which a control signal is transmitted may be expressed in terms of a time resource. As used herein, the term time resource may correspond to any type of physical resource or radio resource expressed in terms of length of time. Examples of time resources include: symbol, mini-slot, time slot, subframe, radio frame, transmission time interval (TTI), short TTI, interleaving time, etc. As one example, the number of repetitions can be expressed in terms of X1 number of subframes and X2 number of subframes containing control signal (e.g. NPDCCH, MPDCCH, WUS, etc.).

At step 302, wireless device 210 compares the obtained information with a threshold. More particularly, at step 302 wireless device 210 uses the obtained information about the repetition number in a comparison that involves comparing the obtained information to a certain threshold (e.g., Nthr–2). In certain embodiments, the comparison results in a Boolean value (i.e., whether the compared value is greater than or equal to Nthr–2). The results of this comparison may be used to determine (e.g., decide or select or use) the measurement mode that wireless device 210 shall apply for performing the measurement, as described in more detail below in relation to step 303. In certain embodiments, the measurement mode that wireless device 210 shall apply may be determined from a plurality of possible measurement modes (e.g., normal measurement mode 105 and relaxed measurement mode 110 described above in relation to FIG. 1).

At step 303, wireless device 210 determines the measurement mode to use based on the outcome of the comparison performed at step 302 described above. In certain embodiments, wireless device 210 may determine which of a plurality of measurement modes should be used. The measurement modes may be associated with different sets of measurement requirements. The term measurement requirement may also be referred to as measurement performance, measurement performance requirements, and performance requirements. In certain embodiments, wireless device 210 may have to meet one or more measurement requirements related to the performed measurement. Examples of measurement requirements include measurement time, number of cells to be measured within the measurement time, measurement reporting delay, measurement accuracy, and measurement accuracy with respect to a reference value (e.g., ideal measurement result). Examples of measurement time include measurement period, cell detection or cell identification period, and evaluation period.

In the example of FIG. 3, wireless device 210 determines whether it should use a normal measurement mode or a relaxed measurement mode. The relaxed measurement mode may have one or more relaxed measurement requirements with respect to reference measurement requirements. Relaxed measurement requirements may include one or more of: a measurement period longer than a reference measurement period; measurement accuracies that include bias larger than a reference bias; and measurement accuracies that are larger than a reference measurement accuracy. For instance, with the relaxed measurement requirements a longer delay (e.g., larger than a certain threshold) can be allowed for wireless device 210 to perform various operational tasks (e.g., RLM, handover, neighbor cell detection, cell re-selection, etc.). In some cases, relaxed measurement mode may also characterize coverage enhancement operation and support of lower mobility. As an example, the reference measurement requirements may correspond to those defined for normal measurement mode. Relaxed measurements may be associated with enhanced coverage operation wherein wireless devices are typically stationary.

The normal measurement mode, on the other hand, may have tighter measurement requirements with respect to the reference measurement requirements. In certain embodiments, the tighter measurement requirements for the normal measurement mode may correspond to the reference measurement requirements (e.g., those defined for normal measurement mode). Examples of tighter measurement requirements may include a measurement period that is shorter than a reference measurement period and/or measurement accuracies that include bias smaller than a reference bias. For instance, with the tighter measurement requirements of the normal measurement mode wireless device 210 may be required to perform various operational tasks in shorter times as compared to the relaxed measurement mode. Moreover, in certain embodiments the normal measurement mode may also characterize good radio conditions (e.g., CE level 0, normal coverage, CEModeA), and in which case the UEs can support higher velocities.

Once wireless device 210 has selected a measurement mode, it may carry out RRM measurements and procedures associated with that mode (e.g., requirements associated with normal coverage, enhanced coverage, CEModeA, CEModeB, or requirements of one mode which are more relaxed compared to the other mode). To illustrate, consider an example scenario for wireless device 210 and wireless device 210b described below in relation to FIG. 4. Note that although the example of FIG. 4 uses NPDCCH as an example of a control signal, the present disclosure is not limited to such an example embodiment. Rather, the present disclosure contemplates that the same principles can be applied when using any type of control signal (e.g. MPDCCH, PDCCH, WUS, etc.).

Figure 4:
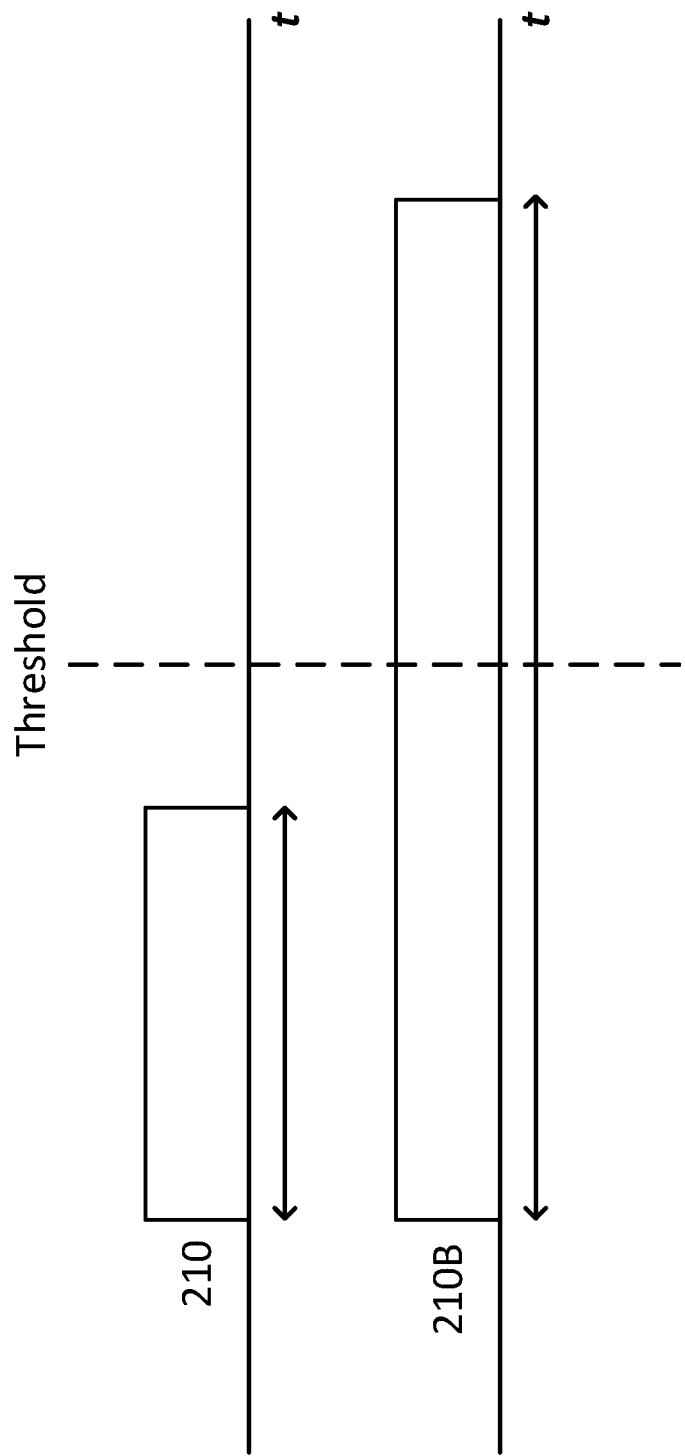
FIG. 4 illustrates an example of NPDCCH decoding over time, in accordance with certain embodiments.

FIG. 4 illustrates an example of NPDCCH decoding over time, in accordance with certain embodiments. Assume that wireless device 210 and wireless device 210b (described above in relation to FIG. 2) are present in the same cell, and both are decoding NPDCCH. As shown in FIG. 4, wireless device 210 is able to decode the NPDCCH in a much shorter time compared to wireless device 210b. This implies that wireless device 210 requires fewer repetitions to successfully decode NPDCCH as compared to wireless device 210b. In this example, the RF front end of wireless device 210b needs to be open for a longer time compared to the RF front end of wireless device 210. The RF front end is the main source of power consumption for wireless device 210 and wireless device 210b. The RF front end may comprise, for example, a power amplifier (PA), radio frequency (RF) filter, low noise amplifier (LNA), receive antenna ports, etc.

From a power consumption perspective, this means that wireless device 210b consumes more power, since its receiver has to be active over a longer time to decode NPDCCH with a larger number of repetitions (compared to those required by wireless device 210). This leads to more power consumption. For such devices, the measurement requirements are typically relaxed (e.g., the cell detection time and measurement time can be longer than for other wireless devices). On the other hand, wireless device 210 is able to decode NPDCCH relatively faster, and therefore its power consumption will be lower compared to that of wireless device 210b.

Returning to FIG. 3 (continuing with the example of FIG. 4), wireless device 210 may determine at step 303 that it should enter the normal measurement mode and proceed to step 304, where wireless device 210 enters normal measurement mode. In this scenario, this may be because the number of repetitions needed for wireless device 210 to successfully decode NPDCCH may be less than a certain threshold (e.g., Nthr–2) as depicted in FIG. 4. In contrast, in this example wireless device 210b may determine at step 303 that it should enter the relaxed measurement mode and proceed to step 305, where wireless device 210b enters relaxed measurement mode. In this scenario, this may be because the number of repetitions needed for wireless device 210b to successfully decode NPDCCH may be greater than a certain threshold (e.g., Nthr–2) as depicted in FIG. 4.

Returning to FIG. 2, according to another example embodiment wireless device 210 may determine whether it is performing one or more measurements on one or more neighbour cells and, based on this determination, further adapt the measurement mode for doing measurement on the serving cell. For example, assume that wireless device 210 is being served by network node 260 (e.g., an eNB or a gNB). Network node 260b may be a neighboring network node associated with one or more neighbor cells. Wireless device 210 may perform one or more measurements on a neighboring cell and further adapt the measurement mode for doing measurements on the serving cell.

In certain embodiments, wireless device 210 may determine whether to perform measurements on the neighbour cell(s) based on the signal level (e.g., signal strength, signal quality, NRSRP, NRSRQ, etc.) of the serving cell. For example, if the serving cell's signal level is above or equal to a certain threshold then wireless device 210 may decide not to perform neighbour cell measurements (e.g., to save its power). But if the serving cell's signal level is below the certain threshold, then wireless device 210 may decide to perform neighbour cell measurements (e.g., to prepare for possible cell reselection).

In one example, if wireless device 210 determines that it is also performing at least one measurement on a neighbour cell then wireless device 210 changes the measurement mode from relaxed measurement mode to the normal measurement mode, regardless of the number of repetitions used by wireless device 210 for decoding the control channel of the serving cell. This will allow wireless device 210 to speed up the serving cell measurements since cell reselection may be required. In another example, if wireless device 210 determines that it is not performing any measurement on any neighbour cell, then wireless device 210 changes the measurement mode based on the number of repetitions used by wireless device 210 for decoding the control channel of the serving cell as described above in the previous example embodiments.

Once a wireless device (e.g., wireless device 210 or wireless device 210b) has entered a certain measurement mode (e.g., relaxed measurement mode), it may need to switch back to a previous mode (e.g., normal measurement mode) under some conditions (e.g., those conditions described above in relation to FIG. 1, such as whether the wireless device has been paged or whether there has been a change in an RRC state of a wireless device). The present disclosure contemplates various approaches for changing measurement modes based on conditions of the wireless device. These conditions, such as the presence of a WUS signal in a serving cell or a change in RRC state of the wireless device, are described in more detail below.

According to one example embodiment, wireless device 210 may obtain one or more of paging information and information about an RRC state of wireless device 210. Wireless device 210 may determine, based on the obtained information, whether to use a normal measurement mode for a period of time to perform one or more measurements or use a relaxed measurement mode to perform the one or more measurements. The steps and procedures involved that may be associated with this example embodiment are described in more detail below in relation to FIG. 5 (with continuing reference to the elements of FIG. 2).

Figure 5:
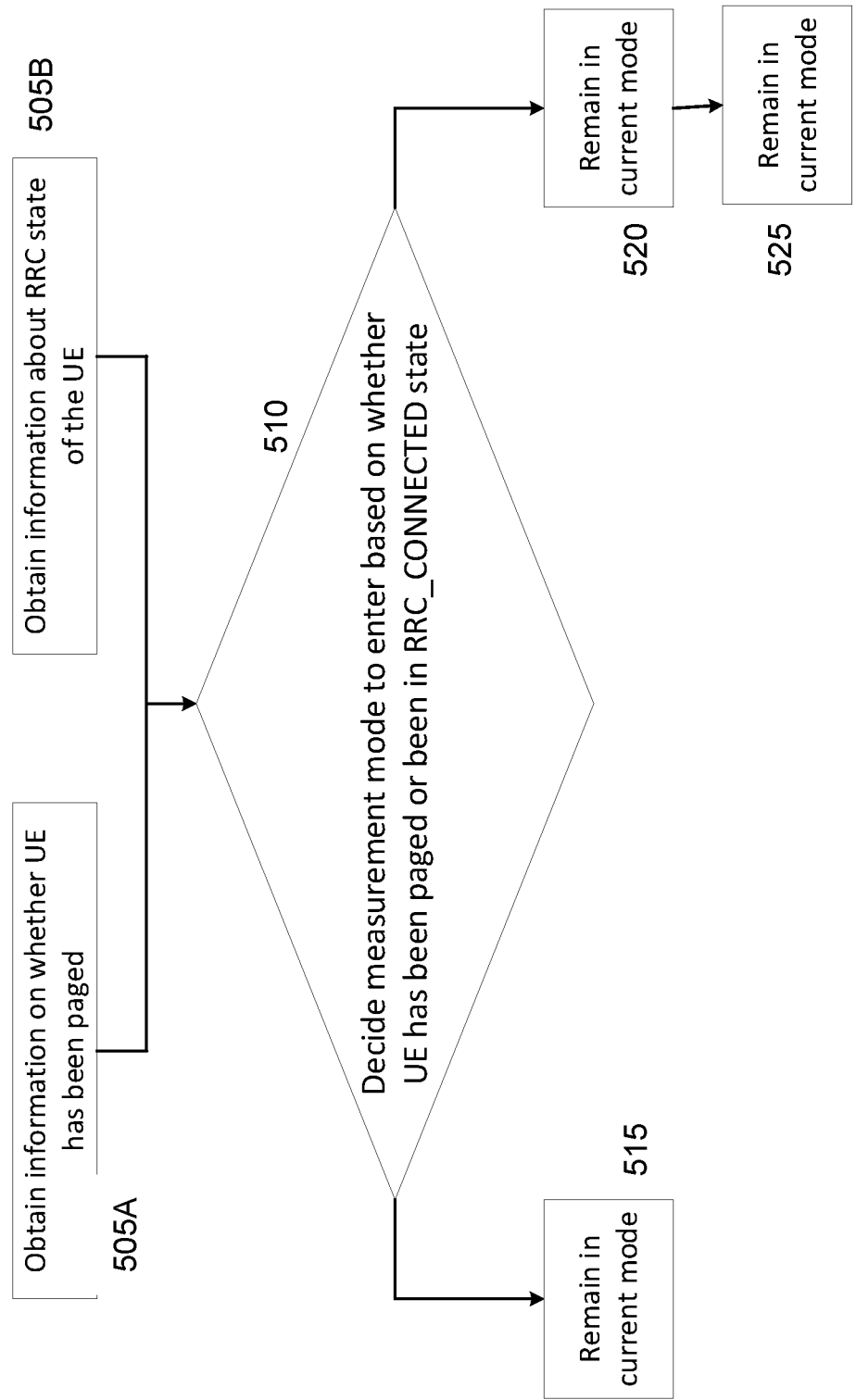
FIG. 5 is a flow diagram of a method in a wireless device, in accordance with certain embodiments.

FIG. 5 is a flow diagram of a method in a wireless device, in accordance with certain embodiments. More particularly, FIG. 5 is a flow diagram showing the conditions for a wireless device (e.g., wireless device 210 or wireless device 210b described above in relation to FIG. 2) switching measurement modes, in accordance with certain embodiments.

At steps 505A and 505B, wireless device 210 (e.g., a UE), obtains information on whether wireless device 210 has been paged and/or whether wireless device 210 has been in a connected state (e.g., RRC_CONNECTED state in the example embodiment of FIG. 5). Wireless device 210 may obtain the information in any suitable manner In certain embodiments, the obtained information may be instantaneous information (e.g., whether wireless device 210 has just been paged and/or whether wireless device 210 has just been in a connected state). In certain embodiments, the obtained information may (additionally or alternatively) be historical information (e.g., whether wireless device 210 has been paged or been in a connected state over a previous duration (e.g., $T_{P0}$ duration)).

At step 510, wireless device 210 uses the obtained information (e.g., information about whether wireless device 210 has been paged or whether wireless device 210 has been in a connected state) to determine which measurement mode to enter. In the example embodiment of FIG. 5, if wireless device 210 has not been paged and has not been in RRC_CONNECTED state, then the method proceeds to step 515 where wireless device 210 remains in its current measurement mode (e.g., relaxed measurement mode). If, however, wireless device 210 determines that it has been paged or that it has been in a connected state, then at step 520 wireless device 210 enters normal measurement mode for a time duration T0. After the time duration T0, the method proceeds to step 525 where the wireless device evaluates relaxed measurement mode criteria.

As a particular example, assume that wireless device 210 is under relaxed measurement mode at the start of the method depicted in FIG. 5. A wireless device that is under relaxed measurement mode can be paged any time. In certain embodiments, upon being paged wireless device 210 shall switch to normal measurement mode for a certain time duration (e.g., $T_0$ ms where $T_0$=K*DRX cycles). After this period, wireless device 210 may evaluate the criteria for enabling the relaxed measurement mode. Such a scenario is illustrated in FIG. 6, described in more detail below.

Figure 6:
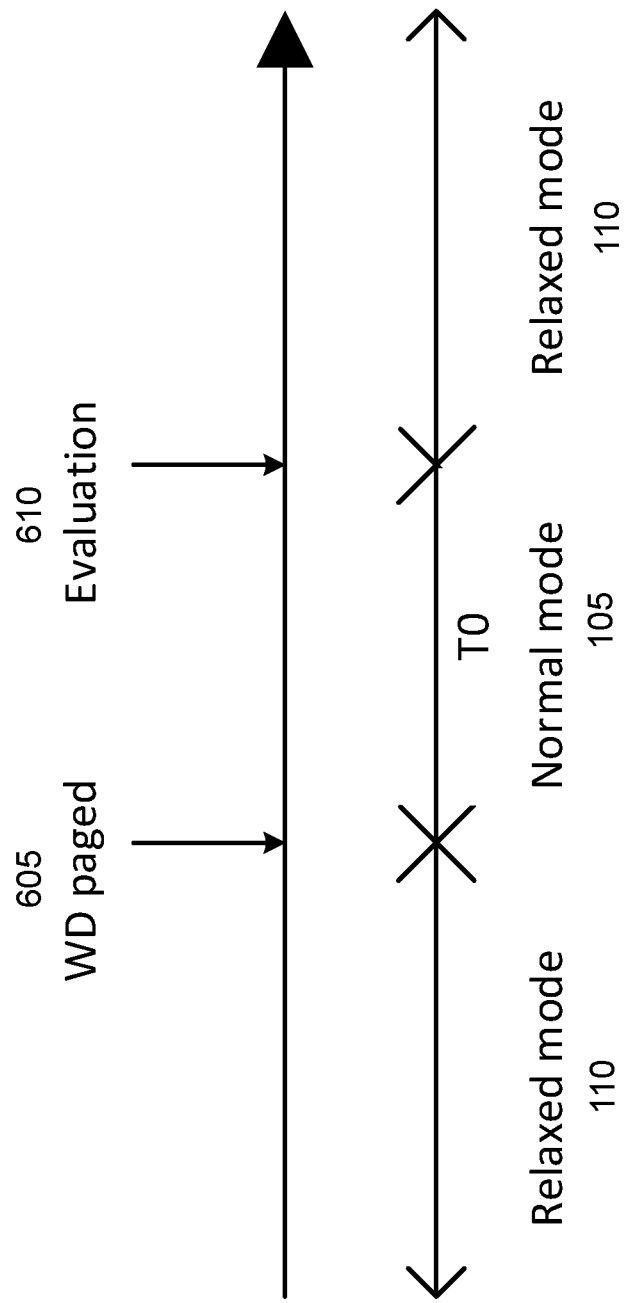
FIG. 6 illustrates an example of a wireless device changing measurement mode upon being paged, in accordance with certain embodiments.

FIG. 6 illustrates an example of a wireless device changing measurement mode upon being paged, in accordance with certain embodiments. Assume that wireless device 210 is initially in a relaxed measurement mode 110. At time instance 605, wireless device 210 is paged. Upon being paged, wireless device 210 enters normal measurement mode 105 for a period of time T0. The rationale behind wireless device 210 entering normal measurement mode 105 for the period of time T0 is that wireless device 210 may with high likelihood re-enter the active mode or can be paged again. It is therefore advantageous for wireless device 210 to remain in normal measurement mode 105 and carry out the measurements and procedures following the normal mode requirements for a certain time (i.e., time period T0). At time instance 610, wireless device 210 may determine, based on one or more criteria being satisfied, whether or not to enter relaxed measurement mode 110 after the period of time (i.e., time period T0) expires. In the example of FIG. 6, wireless device 210 determines to enter relaxed measurement mode 110 after the time period T0 expires.

Although the example of FIG. 6 illustrates the evaluation taking place at the end of the time period T0, the present disclosure is not limited to this example. In certain embodiment, the evaluation may begin before the time period T0 ends and, if wireless device 210 determines that the criteria for relaxed measurement mode 110 are met, wireless device 210 may enter relaxed measurement mode 110 once the time period T0 ends.

Returning to FIG. 2, as another particular example wireless device 210 may have previously been in a relaxed measurement mode while in an idle state (e.g., RRC_IDLE) and transitioned to a connected state (e.g., RRC_CONNECTED) during which time wireless device 210 used the normal measurement mode. At some time, wireless device 210 may switch from the connected state back to the idle state. In such a scenario, it may be desirable for wireless device 210 to remain in the normal measurement mode for a certain period of time. Wireless device 210 may evaluate the criteria for enabling the relaxed measurement mode once the period of time has ended. Such a scenario is illustrated in FIG. 7, described in more detail below.

Figure 7:
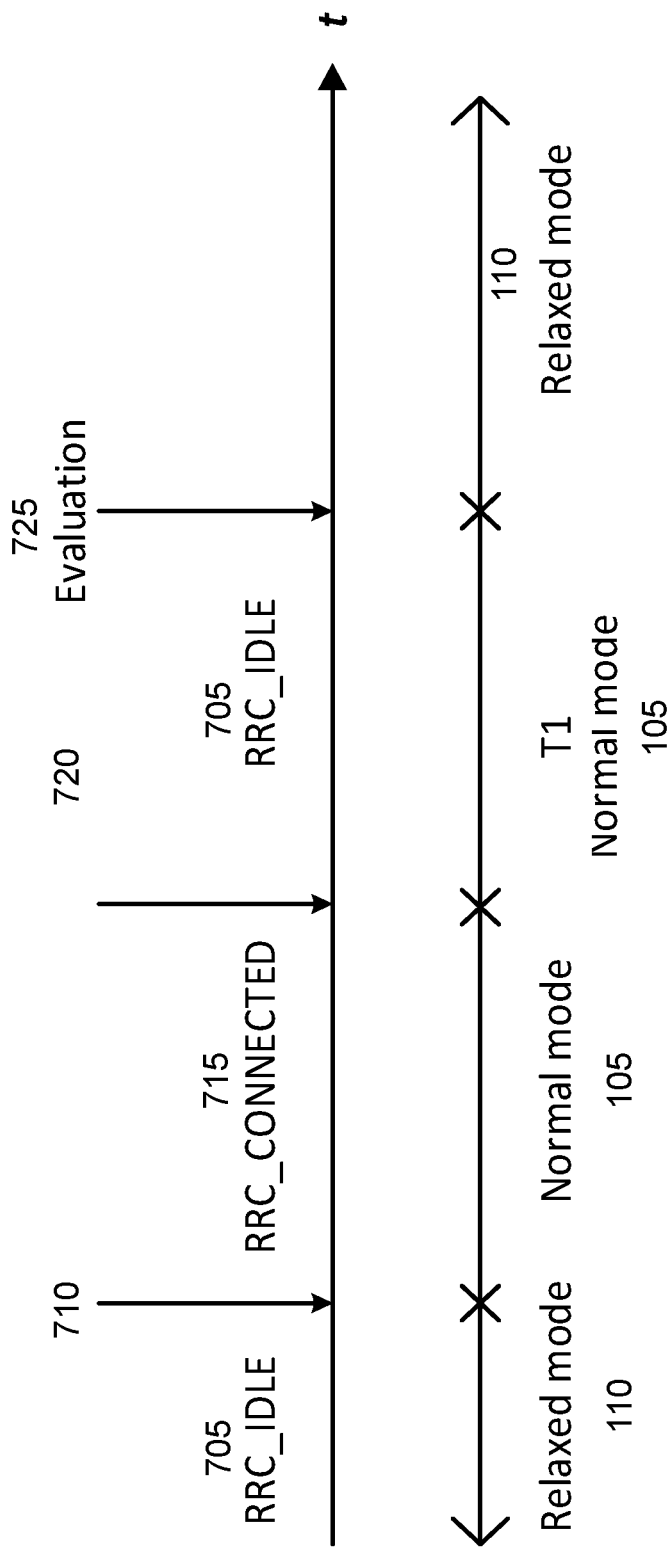
FIG. 7 illustrates an example of a wireless device changing measurement mode upon changing RRC states, in accordance with certain embodiments.

FIG. 7 illustrates an example of a wireless device changing measurement mode upon changing RRC states, in accordance with certain embodiments. Assume that wireless device 210 is initially in an idle state 705 (e.g., RRC_IDLE) using relaxed measurement mode 110. At time instance 710, wireless device 210 transitions from idle state 705 to a connected state 715 (e.g., RRC_CONNECTED) and begins using normal measurement mode 105. When wireless device 210 later transitions from connected state 715 to idle state 705 at time instance 720, wireless device 210 remains in normal measurement mode 105 for a certain time (e.g., T ms where $T_1$=L*DRX cycles) rather than entering relaxed measurement mode 110. The rationale for not entering relaxed measurement mode 110 directly is that wireless device 210 is likely to re-enter connected state 715 again, since it has just been engaged in data transmission/reception and therefore it is likely to re-enter that state again. It is therefore advantageous for wireless device 210 to remain in normal measurement mode 105 and carry out the measurements and procedures following the normal mode requirements for a certain time (i.e., time period $T_1$). At time instance 725, wireless device 210 may determine, based on one or more criteria being satisfied, whether or not to enter relaxed measurement mode 110 once the period of time $T_1$ has ended.

Although the example of FIG. 7 illustrates the evaluation taking place at the end of time period $T_1$, the present disclosure is not limited to this example. In certain embodiment, the evaluation may begin before the time period $T_1$ ends and, if wireless device 210 determines that the criteria for relaxed measurement mode 110 have been met, wireless device 210 may enter the relaxed measurement mode 110 once the time period $T_1$ ends.

As described above in relation to FIGS. 6 and 7, K and L may be used to define the period of $T_0$ and $T_1$, respectively, which may be expressed in terms of DRX cycles. For example, the durations of T0 and $T_1$ may be such that $T_0$=K*DRX cycles and $T_1$=L*DRX cycles. In certain embodiments, K and L may be different. In certain embodiments, K may be equal to L. In certain embodiments, K and L may be integer values (e.g., 1,2,3,4, etc.).

Figure 8:
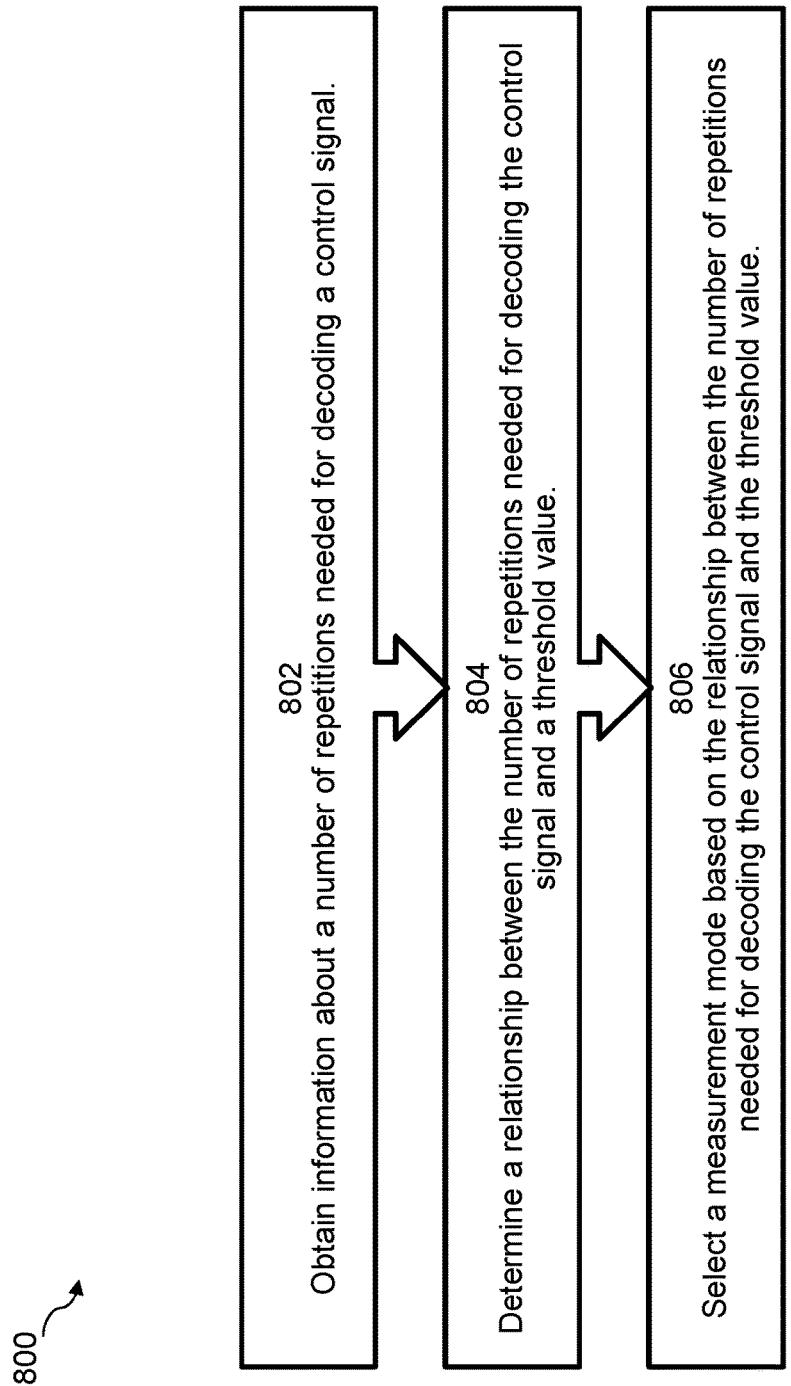
FIG. 8 is a flowchart of a method in a UE, in accordance with certain embodiments.

FIG. 8 is a flowchart of a method in a UE, in accordance with certain embodiments. Method 800 begins at step 802, where the UE obtains information about a number of repetitions needed for decoding a control signal. In certain embodiments, the obtained information about the number of repetitions needed for decoding the control signal may comprise explicit information about a required number of repetitions. In certain embodiments, the obtained information about the number of repetitions needed for decoding the control signal may comprise an indication that the number of repetitions needed for decoding the control signal is above or below the threshold value. In certain embodiments, the number of repetitions needed for decoding the control signal may be expressed in terms of a time resource.

At step 804, the UE determines a relationship between the number of repetitions needed for decoding the control signal and a threshold value. In certain embodiments, the threshold value may be based on a target BLER with which the control signal should be received at the wireless device. In certain embodiments, the relationship between the number of repetitions needed for decoding the control signal and the threshold value may comprise one of: the number of repetitions needed for decoding the control signal is below the threshold value; the number of repetitions needed for decoding the control signal is equal to the threshold value; and the number of repetitions needed for decoding the control signal is above the threshold value. In certain embodiments, determining the relationship between the number of repetitions needed for decoding the control signal and the threshold value may comprise comparing the obtained information about the number of repetitions needed for decoding a control signal to the threshold value.

At step 806, the wireless device selects a measurement mode based on the relationship between the number of repetitions needed for decoding the control signal and the threshold value. In certain embodiments, the selected measurement mode may be a relaxed measurement mode. In certain embodiments, the selected measurement mode may be a normal measurement mode.

In certain embodiments, method 800 may comprise performing one or more measurements according to the selected measurement mode.

In certain embodiments, method 800 may comprise one or more of: obtaining information about whether the wireless device has been paged; and obtaining information about an RRC state of the wireless device. In certain embodiments, the selected measurement mode may be a first measurement mode, and method 800 may further comprise determining, based on one or more of the obtained information about whether the wireless device has been paged and the obtained information about the RRC state of the wireless device, a second measurement mode to enter.

In certain embodiments, the second measurement mode may be the same as the first measurement mode. In certain embodiments, the second measurement mode may be different from the first measurement mode.

In certain embodiments, the first measurement mode may be a relaxed measurement mode. Method 800 may further comprise obtaining information about whether the wireless device has been paged, the obtained information indicating that the wireless device has been paged, and switching to the second measurement mode for a period of time, wherein the second measurement mode is a normal measurement mode. In certain embodiments, method 800 may comprise re-evaluating, after the period of time, whether to remain in the second measurement mode.

In certain embodiments, the first measurement mode may be a normal measurement mode. Method 800 may further comprise obtaining information about the radio resource control state of the wireless device, the obtained information indicating that the wireless device is switching from a connected state to an idle state. Method 800 may further comprise determining to remain in the normal measurement mode for a period of time. In certain embodiments, method 800 may comprise re-evaluating, after the period of time, whether to switch to the second measurement mode, wherein the second measurement mode is a relaxed measurement mode.

In certain embodiments, method 800 may further comprise providing user data, and forwarding the user data to a host computer via the transmission to the base station.

Figure 9:
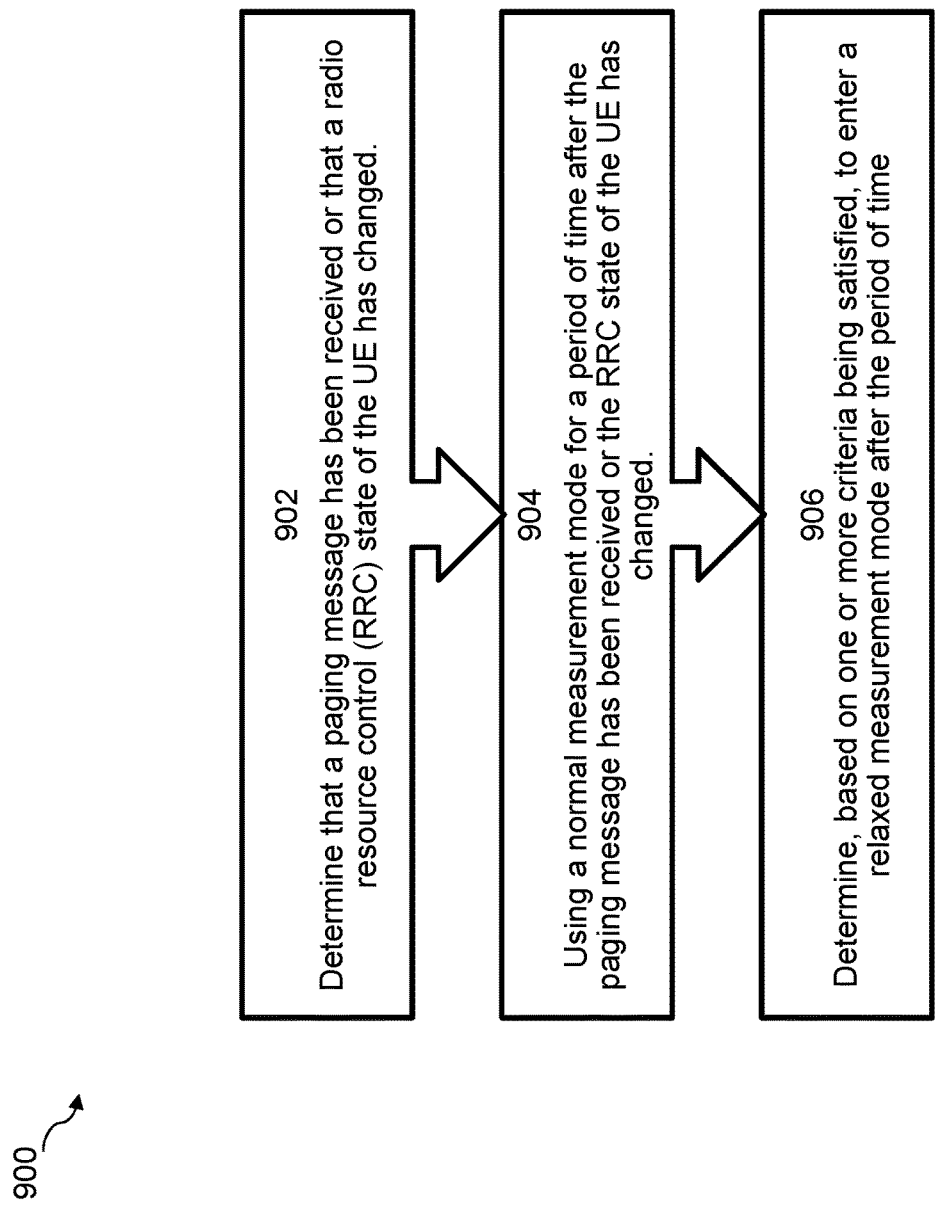
FIG. 9 is a flowchart of a method in a UE, in accordance with certain embodiments.

FIG. 9 is a flowchart of a method in a UE, in accordance with certain embodiments. Method 900 begins at step 902, where the UE determines that a paging message has been received or that an RRC state of the UE has changed.

In certain embodiments, method 900 may further comprise obtaining paging information indicating that the UE has been paged. Method 900 may further comprise determining, based on the obtained paging information, that the paging message has been received. In certain embodiments, the obtained paging information may comprise one or more of: current paging information; and historical paging information.

In certain embodiments, method 900 may further comprise obtaining information about the RRC state of the UE. The information about the RRC state of the UE may indicate that the UE has been in a connected state. Method 900 may further comprise determining that the RRC state of the UE has changed based on the obtained information about the RRC state of the UE. In certain embodiments, the obtained information about the RRC state of the UE may comprise one or more of: current RRC state information; and historical RRC state information.

At step 904, the UE uses a normal measurement mode for a period of time after the paging message has been received or the RRC state of the UE has changed. In certain embodiments, the UE may be in an idle state (e.g., RRC_IDLE state) while using the normal measurement mode for the period of time.

In certain embodiments, a duration of the period of time may be equal to a number of DRX cycles of the UE. In certain embodiments, the duration of the period of time may be predefined. In certain embodiments, method 900 may further comprise receiving an indication of the duration of the period of time from a network node.

In certain embodiments, a duration of the period of time may be based on whether the paging message has been received or the RRC state of the UE has changed. In certain embodiments, the period of time may have a first duration when the paging message has been received or the period of time may have a second duration when the RRC state of the UE has changed. The second duration may be different from the first duration.

In certain embodiments, method 900 may further comprise determining, based on whether one or more criteria are satisfied, whether to remain in the normal measurement mode or enter the relaxed measurement mode after the period of time.

At step 906, the UE determines, based on one or more criteria being satisfied, to enter a relaxed measurement mode after the period of time. In certain embodiments, method 900 may further comprise entering the relaxed measurement mode after the period of time. In certain embodiments, the normal measurement mode and the relaxed measurement mode may have different measurement requirements.

Figure 10:
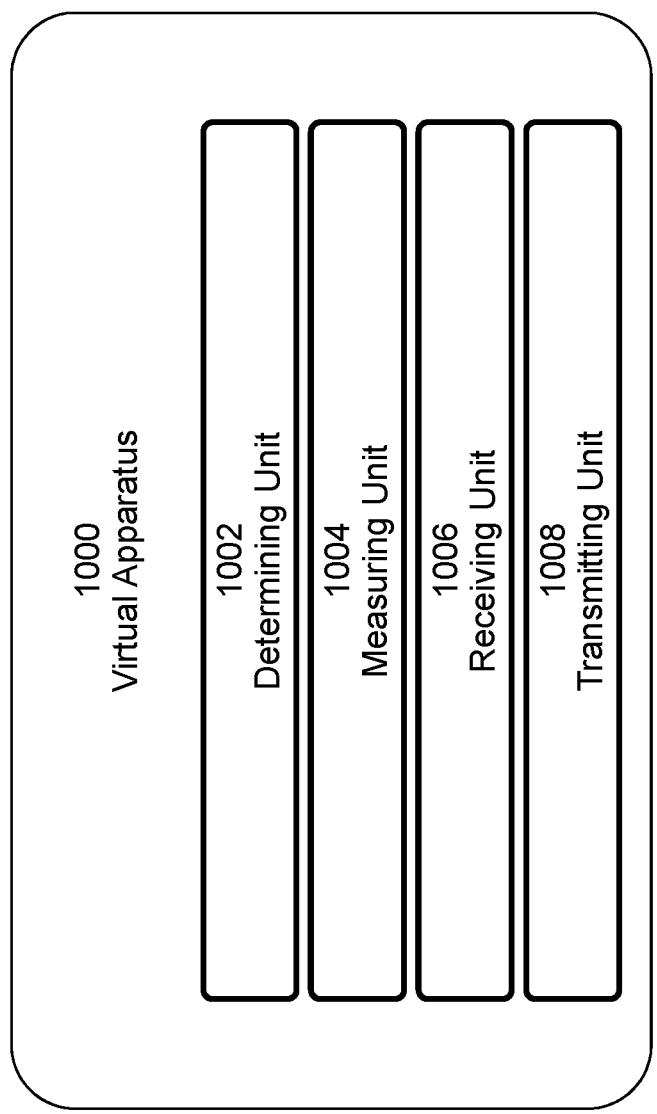
FIG. 10 is a schematic block diagram of a virtualization apparatus, in accordance with certain embodiments.

FIG. 10 is a schematic block diagram of a virtualization apparatus, in accordance with certain embodiments. More particularly, FIG. 10 illustrates a schematic block diagram of an apparatus 1000 in a wireless network (for example, the wireless network shown in FIG. 2). The apparatus may be implemented in a wireless device (e.g., wireless device 210 shown in FIG. 2). Apparatus 1000 is operable to carry out the example methods described with reference to FIGS. 8 and 9 and possibly any other processes or methods disclosed herein. It is also to be understood that the method of FIGS. 8 and 9 are not necessarily carried out solely by apparatus 1000. At least some operations of the method can be performed by one or more other entities.

Virtual Apparatus 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 1002, measuring unit 1004, receiving unit 1006, transmitting unit 1008, and any other suitable units of apparatus 1000 to perform corresponding functions according one or more embodiments of the present disclosure.

In certain embodiments, apparatus 1000 may be a wireless device (e.g., a UE). As illustrated in FIG. 10, apparatus 1000 includes determining unit 1002, measuring unit 1004, receiving unit 1006, and transmitting unit 1008. Determining unit 1002 may be configured to perform the processing functions of apparatus 1000.

As one example, determining unit 1002 may be configured to determine that a paging message has been received or that an RRC state of the wireless device has changed. In certain embodiments, determining unit 1002 may be configured to obtain paging information indicating that the wireless device has been paged and to determine, based on the obtained paging information, that the paging message has been received. In certain embodiments, determining unit 1002 may be configured to obtain information about the RRC state of the wireless device and to determine that the RRC state of the wireless device has changed based on the obtained information about the RRC state of the wireless device. As another example, determining unit 1002 may be configured to determine to use a normal measurement mode for a period of time after the paging message has been received or the RRC state of the UE has changed. As still another example, determining unit 1002 may be configured to determine, based on one or more criteria being satisfied, to enter a relaxed measurement mode after the period of time. In certain embodiments, determining unit 1002 may be configured to determine, based on whether one or more criteria are satisfied, whether to remain in the normal measurement mode or enter the relaxed measurement mode after the period of time. In certain embodiments, determining unit 1002 may be configured to enter the relaxed measurement mode after the period of time.

In certain embodiments, determining unit 1002 may be configured to obtain information about a number of repetitions needed for decoding a control signal. Determining unit 1002 may be configured to determine a relationship between the number of repetitions needed for decoding the control signal and a threshold value. Determining unit 1002 may be configured to compare the obtained information about the number of repetitions needed for decoding a control signal to the threshold value. Determining unit 1002 may be configured to select a measurement mode based on the relationship between the number of repetitions needed for decoding the control signal and the threshold value.

In certain embodiments, determining unit 1002 may be configured to obtain information about whether the wireless device has been paged. Determining unit 1002 may be configured to obtain information about a radio resource control state of the wireless device. In certain embodiments, the selected measurement mode may be a first measurement mode, and determining unit 1002 may be configured to determine, based on one or more of the obtained information about whether the wireless device has been paged and the obtained information about the radio resource control state of the wireless device, a second measurement mode to enter. Determining unit 1002 may be configured to switch to the second measurement mode for a period of time. Determining unit 1002 may be configured to re-evaluate, after the period of time, whether to remain in the second measurement mode. In certain embodiments, determining unit 1002 may be configured to determine to remain in a normal measurement mode for a period of time. Determining unit 1002 may be configured to re-evaluate, after the period of time, whether to switch to the second measurement mode. As another example, determining unit 1002 may be configured to provide user data.

Determining unit 1002 may include or be included in one or more processors, such as processing circuitry 220 described above in relation to FIG. 2. Determining unit 1002 may include analog and/or digital circuitry configured to perform any of the functions of determining unit 1002 and/or processing circuitry 220 described above. The functions of determining unit 1002 may, in certain embodiments, be performed in one or more distinct units.

In certain embodiments, measuring unit 1004 may be configured to perform the measuring functions of virtual apparatus 1000. For example, measuring unit 1004 may be configured to use a normal measurement mode for a period of time after the paging message has been received or the RRC state of the UE has changed. As another example, measuring unit 1004 may be configured to use a relaxed measurement mode after the period of time. As still another example, measuring unit 1004 may be configured to perform one or more measurements according to the selected measurement mode.

In certain embodiments, receiving unit 1006 may be configured to perform the receiving functions of virtual apparatus 1000. For example, receiving unit 1006 may be configured to receive an indication of the duration of the period of time from a network node.

For example, receiving unit 1006 may be configured to obtain information about a number of repetitions needed for decoding a control signal. As another example, receiving unit 1006 may be configured to obtain information about whether the wireless device has been paged. As another example, receiving module 1006 may be configured to obtain information about a radio resource control state of the wireless device.

Receiving unit 1006 may receive any suitable information (e.g., from a network node or another wireless device). Receiving unit 1006 may include a receiver and/or a transceiver, such as RF transceiver circuitry 222 described above in relation to FIG. 2. Receiving unit 1006 may include circuitry configured to receive messages and/or signals (wireless or wired). In particular embodiments, receiving unit 1006 may communicate received messages and/or signals to determining unit 1002 and/or any other suitable unit of apparatus 1000. The functions of receiving unit 1006 may, in certain embodiments, be performed in one or more distinct units.

In certain embodiments, transmitting unit 1008 may be configured to perform the transmission functions of apparatus 1000. For example, transmitting unit 1008 may be configured to forward the user data to a host computer via a transmission to the base station. Transmitting unit 1008 may include a transmitter and/or a transceiver, such as RF transceiver circuitry 222 described above in relation to FIG. 2. Transmitting unit 1008 may include circuitry configured to transmit messages and/or signals (e.g., through wireless or wired means). In particular embodiments, transmitting unit 1008 may receive messages and/or signals for transmission from determining unit 1002 or any other unit of apparatus 1000. The functions of transmitting unit 1008 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 11:
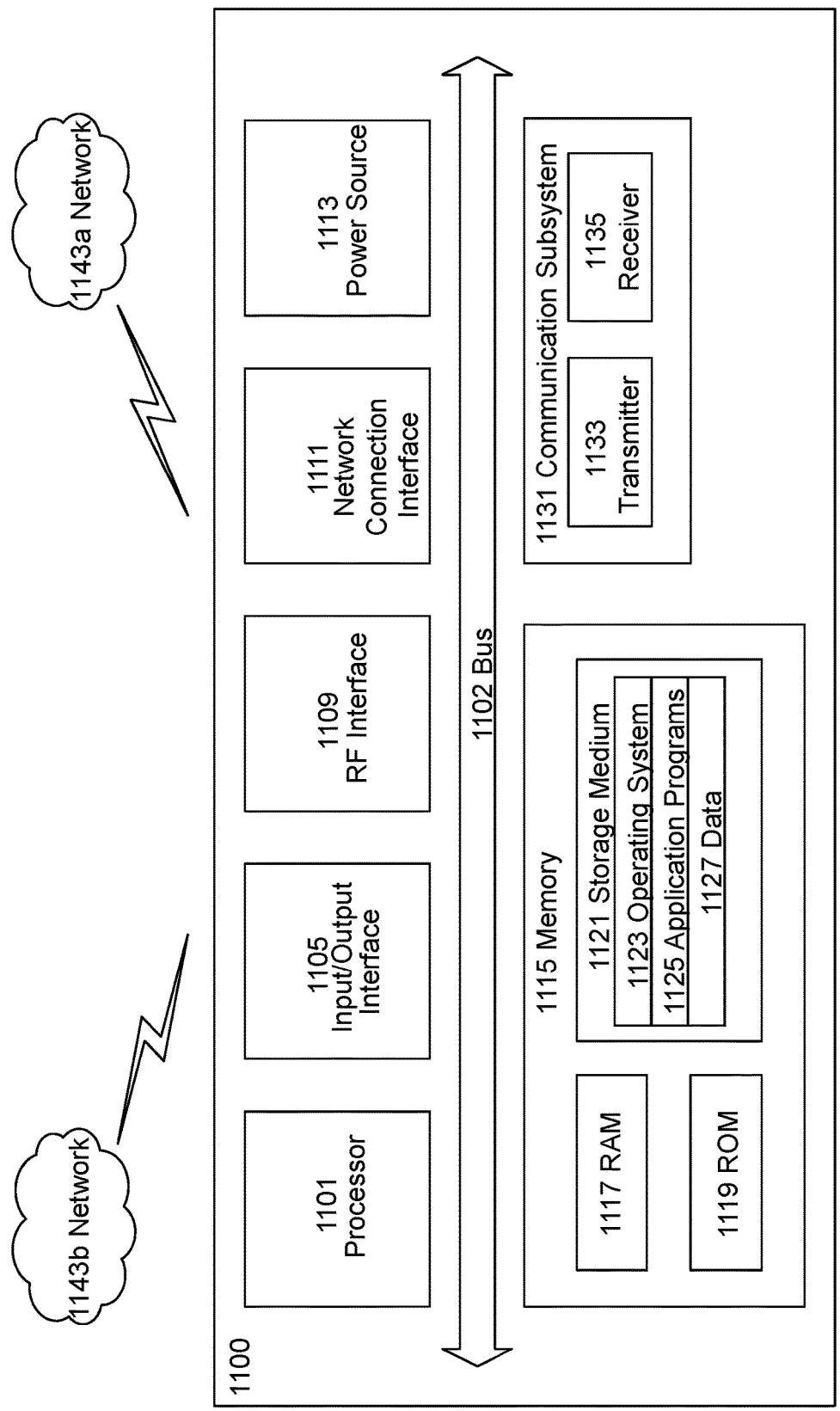
FIG. 11 illustrates one embodiment of a UE, in accordance with certain embodiments.

FIG. 11 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3$^{rd}$ Generation Partnership Project (3GPP), including a NB-IoT UE, a machine type communication (MTC) UE, and/or an enhanced MTC (eMTC) UE. UE 1100, as illustrated in FIG.

11, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 11 is a UE, the components discussed herein are equally applicable to a wireless device, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
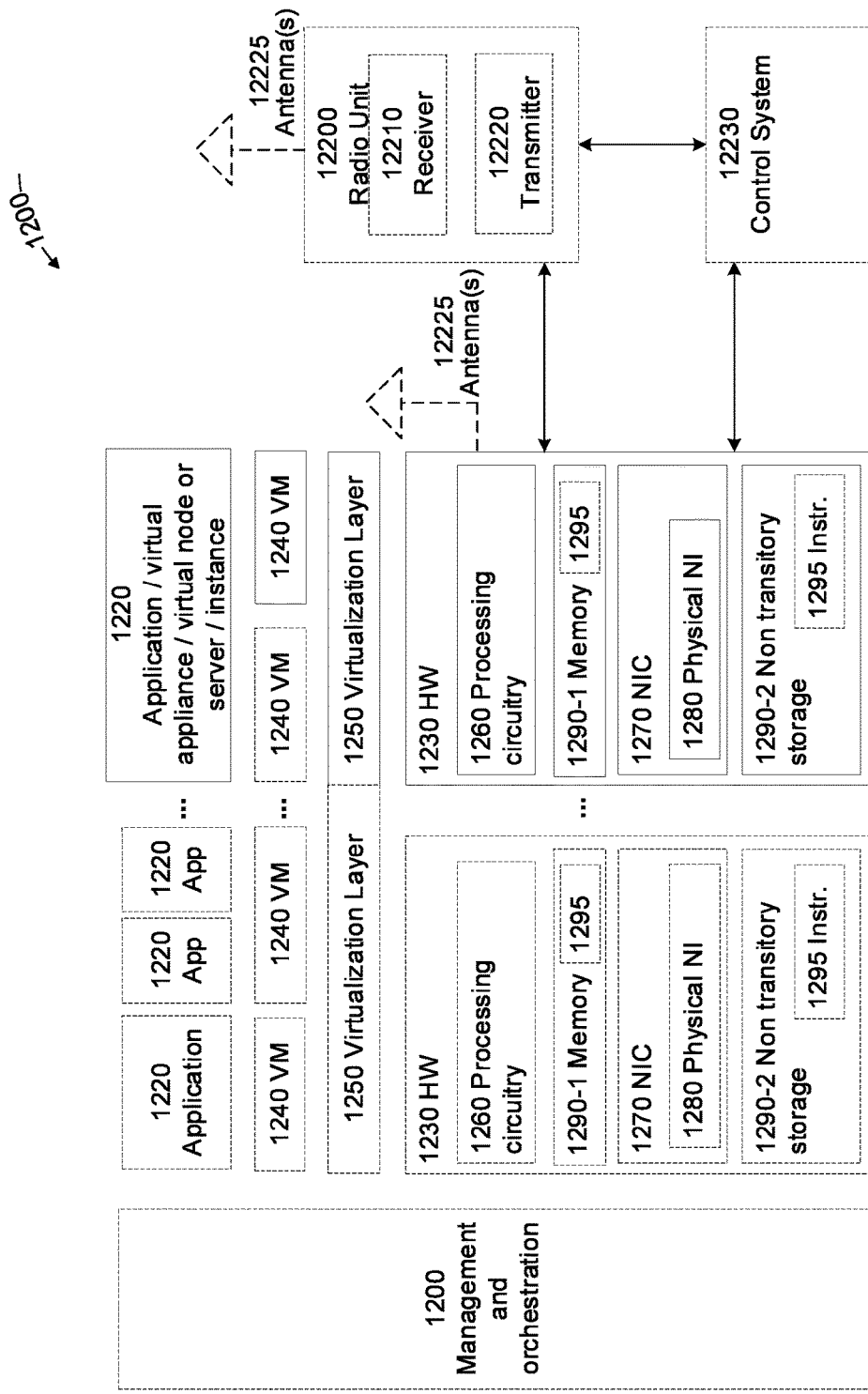
FIG. 12 is a schematic block diagram illustrating a virtualization environment, in accordance with certain embodiments.

FIG. 12 is a schematic block diagram illustrating a virtualization environment, in accordance with certain embodiments. More particularly, FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
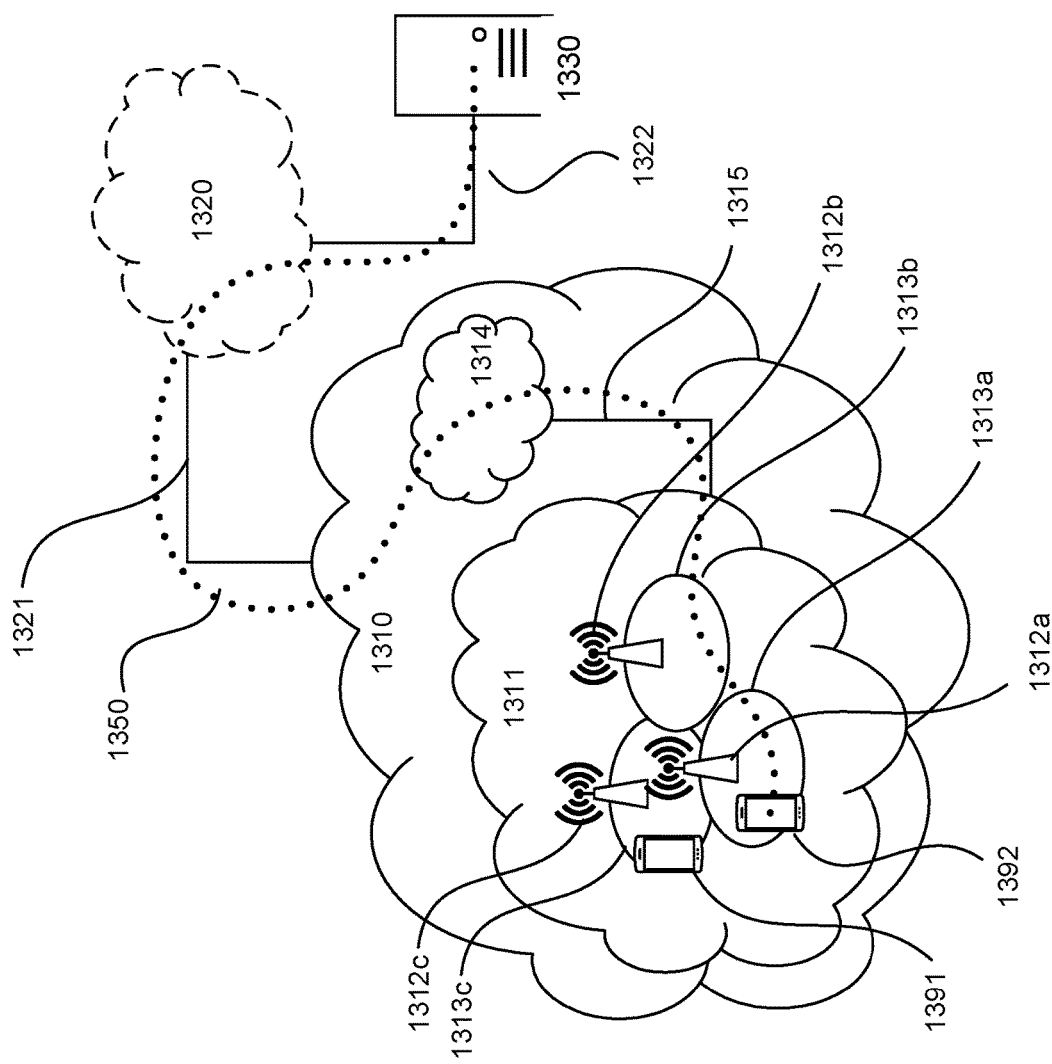
FIG. 13 illustrates an example telecommunication network connected via an intermediate network to a host computer, in accordance with certain embodiments.

FIG. 13 illustrates an example telecommunication network connected via an intermediate network to a host computer, in accordance with certain embodiments. With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
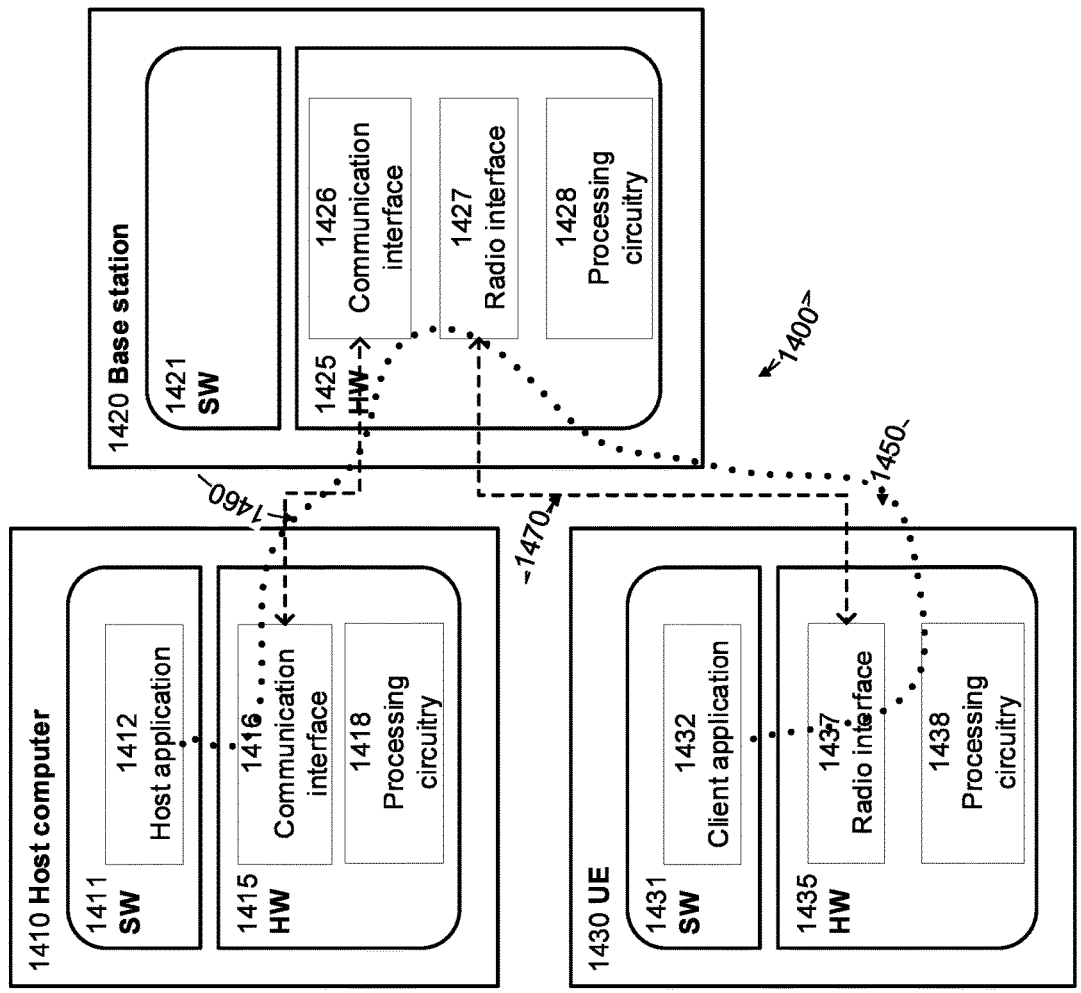
FIG. 14 illustrates an example of a host computer communicating via a base station with a UE over a partially wireless connection, in accordance with certain embodiments.

FIG. 14 illustrates an example of a host computer communicating via a base station with a UE over a partially wireless connection, in accordance with certain embodiments. Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the power consumption and thereby provide benefits such as extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

FIG. 15 is a flowchart of a method implemented in a communication system, in accordance with certain embodiments. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 is a flowchart of a method implemented in a communication system, in accordance with certain embodiments. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figures 17, 18:
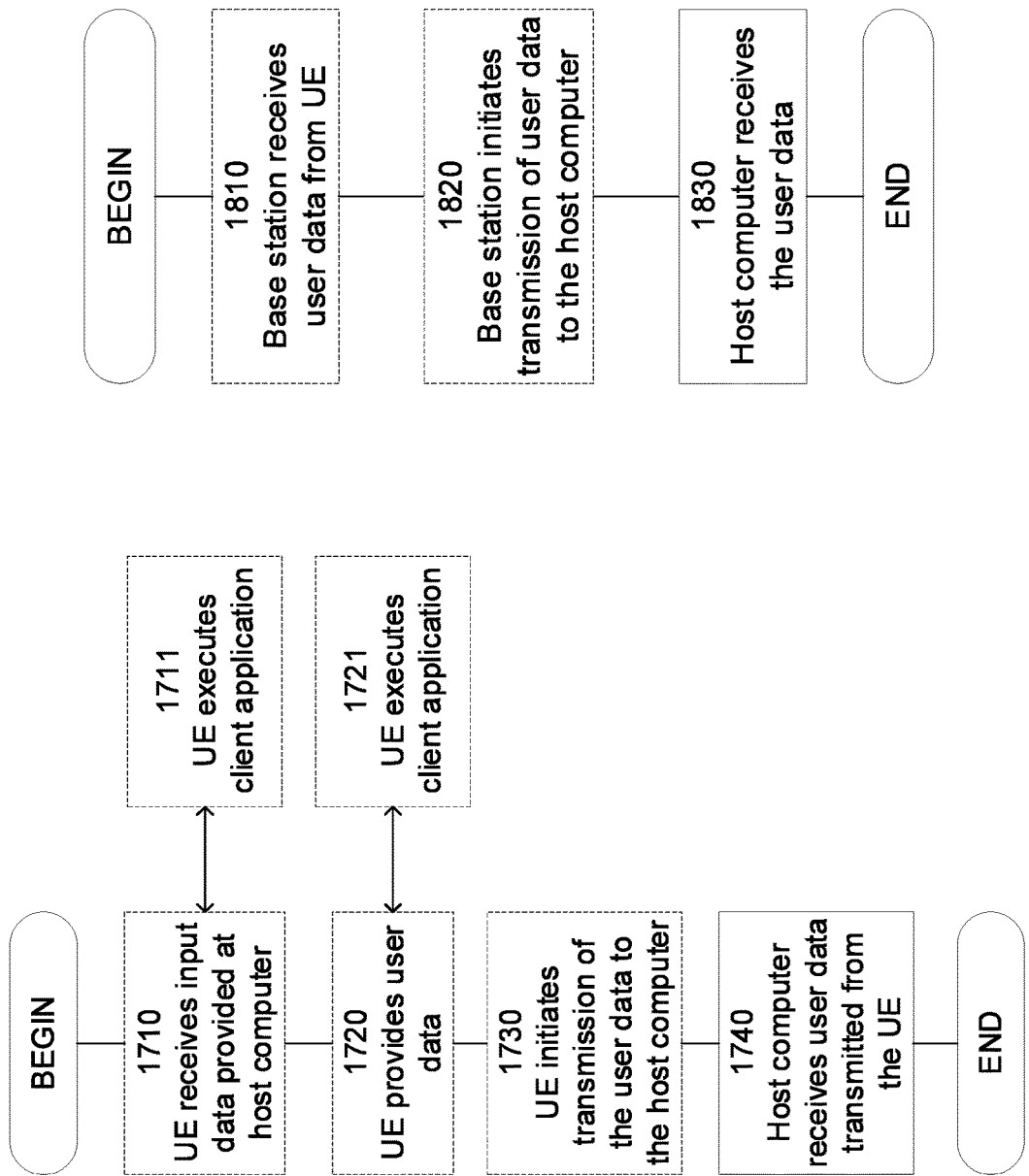
FIG. 17 is a flowchart of a method implemented in a communication system, in accordance with certain embodiments.
FIG. 18 is a flowchart of a method implemented in a communication system, in accordance with certain embodiments.

FIG. 17 is a flowchart of a method implemented in a communication system, in accordance with certain embodiments. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18 is a flowchart of a method implemented in a communication system, in accordance with certain embodiments. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
1×RTT CDMA2000 1× Radio Transmission Technology
3GPP 3rd Generation Partnership Project
5G 5th Generation
ABS Almost Blank Subframe
ACK Acknowledged
ADC Analog-to-Digital Conversion
AGC Automatic Gain Control
ANR Automatic Neighbor Relations
AP Access Point
ARQ Automatic Repeat Request
AWGN Additive White Gaussian Noise
BCCH Broadcast Control Channel
BCH Broadcast Channel
BLER Block Error Rate
BS Base Station
BSC Base Station Controller
BTS Base Station Transceiver
CA Carrier Aggregation
CC Component Carrier
CCCH SDU Common Control Channel SDU
CDMA Code Division Multiplexing Access
CE Coverage Enhancement
CG Cell Group
CGI Cell Global Identity
CIR Channel Impulse Response
CP Cyclic Prefix
CPICH Common Pilot Channel
CPICH Ec/No CPICH Received energy per chip divided by the power density in the band
CQI Channel Quality Indicator
C-RNTI Cell RNTI
CRS Cell Specific Reference Signal
CSG Closed Subscriber Group
CSI Channel State Information
CSI-RS Channel State Information Reference Signal
DAS Distributed Antenna System
DB Decibels
DC Dual Connectivity
DCCH Dedicated Control Channel
DFT Discrete Fourier Transform
DL Downlink
DL-SCH Downlink Shared Channel
DM Demodulation
DMRS Demodulation Reference Signal
DRX Discontinuous Reception
DTX Discontinuous Transmission
DTCH Dedicated Traffic Channel
DUT Device Under Test
EARFCN Evolved Absolute Radio Frequency Channel Number
E-CID Enhanced Cell-ID (positioning method)
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
FFT Fast Fourier Transform
GERAN GSM EDGE Radio Access Network
gNB Base station in NR
GNSS Global Navigation Satellite System
GSM Global System for Mobile communication
HARQ Hybrid Automatic Repeat Request
HD-FDD Half Duplex FDD HO Handover
HSPA High Speed Packet Access
HRPD High Rate Packet Data
IoT Internet-of-Things
LNA Low Noise Amplifier
LOS Line of Sight
LPP LTE Positioning Protocol
LTE Long-Term Evolution
M2M Machine-to-Machine
MAC Medium Access Control
MBB Mobile Broadband
MBMS Multimedia Broadcast Multicast Services
MBSFN Multimedia Broadcast multicast service Single Frequency Network
MBSFN ABS MBSFN Almost Blank Subframe
MCG Master Cell Group
MDT Minimization of Drive Tests
MeNB Master eNB
MHz Megahertz
MIB Master Information Block
MME Mobility Management Entity
MPDCCH MTC Physical Downlink Control Channel
MRS Multi-Standard Radio
MRTD Maximum Receive Timing Difference
MSC Mobile Switching Center
MTC Machine-Type Communication
NACK Not Acknowledged
NB Narrowband
NB-CRS Narrowband Cell Specific Reference Signal
NB-IoT Narrowband Internet-of-Things
NB-MIB Narrowband Master Information Block
NB-SSS/NSSSNarrowband Secondary Synchronization Signal
NB-PSS/NPSSNarrowband Primary Synchronization Signal
NBPRB Narrowband Physical Resource Block
NPBCH Narrowband Physical Broadcast Channel
NPDCCH Narrowband Physical Downlink Control Channel
NPDSCH Narrowband Physical Downlink Shared Channel
NR New Radio
NRS Narrowband Reference Signal
NRSRP Narrowband RSRP
NRSRQ Narrowband RSRQ
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PA Power Amplifier
PBCH Physical Broadcast Channel
PCC Primary Component Carrier
P-CCPCH Primary Common Control Physical Channel
PCell Primary Cell
PCFICH Physical Control Format Indicator Channel
PCG Primary Cell Group
PCH Paging Channel
PCI Physical Cell Identity
PDCCH Physical Downlink Control Channel
PDP Profile Delay Profile
PDSCH Physical Downlink Shared Channel
PDU Protocol Data Unit
PGW Packet Gateway
PHICH Physical Hybrid-ARQ Indicator Channel
PLMN Public Land Mobile Network
PMI Precoder Matrix Indicator
PO Paging Occasion
PRACH Physical Random Access Channel
PRB Physical Resource Block
PRS Positioning Reference Signal
PSC Primary Serving Cell
PSCell Primary SCell
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RB Resource Blocks
RF Radio Frequency
RLM Radio Link Monitoring
RNC Radio Network Controller
RNTI Radio Network Temporary Identifier
RRC Radio Resource Control
RRH Remote radio head
RRM Radio Resource Management
RRU Remote radio unit
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RV Redundancy Version
RX Receiver
SCC Secondary component carrier
SCH Synchronization Channel
SCell Secondary Cell
SC-FDMA Single Carrier-Frequency Division Multiple Access
SCG Secondary Cell Group
SDU Service Data Unit
SeNB Secondary eNode B
SFN System Frame Number
SGW Serving Gateway
SI System Information
SIB System Information Block
SIB1 System Information Block Type 1
SINR Signal to interference and noise ratio
SNR Signal to Noise Ratio
SON Self Organizing Network
SS Synchronization Signal
SSC Secondary serving cell
SSS Secondary Synchronization Signal
TA Timing Advance
TAG Timing Advance Group
TDD Time Division Duplex
TDOA Time Difference of Arrival
TOA Time of Arrival
TSS Tertiary Synchronization Signal
TTI Transmission Time Interval
TX Transmitter
UARFCN UMTS Absolute Radio Frequency Channel Number
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
WUS Wake-Up Signal

The invention claimed is:

1. A method in a user equipment (UE), comprising:
using a first measurement mode for a period of time after a paging message has been received or after a change in Radio Resource Control (RRC) state of the UE; and
determining, based on one or more criteria being satisfied, to enter a second measurement mode after the period of time, the second measurement mode being a relaxed measurement mode relative to the first measurement mode.

2. The method of claim 1, further comprising:
obtaining paging information indicating that the UE has been paged; and
determining, based on the obtained paging information, that the paging message has been received.

3. The method of claim 2, wherein the obtained paging information comprises one or more of:
current paging information; and
historical paging information.

4. The method of claim 1, further comprising:
obtaining information about the RRC state of the UE, the information about the RRC state of the UE indicating that the UE has been in a connected state; and
determining that the RRC state of the UE has changed based on the obtained information about the RRC state of the UE.

5. The method of claim 4, wherein the obtained information about the RRC state of the UE comprises one or more of:
current RRC state information; and
historical RRC state information.

6. The method of claim 1, wherein the UE is in an idle state while using the normal measurement mode for the period of time.

7. The method of claim 1, further comprising:
determining, based on whether the one or more criteria are satisfied, whether to remain in the normal measurement mode or enter the relaxed measurement mode after the period of time.

8. The method of claim 1, further comprising entering the relaxed measurement mode after the period of time.

9. The method of claim 1, wherein the normal measurement mode and the relaxed measurement mode have different measurement requirements.

10. The method of claim 1, wherein a duration of the period of time is equal to a number of discontinuous reception cycles of the UE.

11. The method of claim 10, wherein the duration of the period of time is predefined.

12. The method of claim 10, further comprising:
receiving an indication of the duration of the period of time from a network node.

13. The method of claim 1, wherein a duration of the period of time is based on whether the paging message has been received or the RRC state of the UE has changed.

14. The method of claim 13, wherein:
the period of time has a first duration when the paging message has been received; or
the period of time has a second duration when the RRC state of the UE has changed, the second duration different from the first duration.

15. A user equipment (UE), comprising:
a receiver;
a transmitter; and
processing circuitry coupled to the receiver and the transmitter, the processing circuitry being configured to:
use a first measurement mode for a period of time after a paging message has been received or after a change in Radio Resource Control (RRC) state of the UE; and
determine, based on one or more criteria being satisfied, to enter a second measurement mode after the period of time, the second measurement mode being a relaxed measurement mode relative to the first measurement mode.

16. The UE of claim 15, wherein the processing circuitry is further configured to:
obtain paging information indicating that the UE has been paged; and
determine, based on the obtained paging information, that the paging message has been received.

17. The UE of claim 16, wherein the obtained paging information comprises one or more of:
current paging information; and
historical paging information.

18. The UE of claim 15, wherein the processing circuitry is further configured to:
obtain information about the RRC state of the UE, the information about the RRC state of the UE indicating that the UE has been in a connected state; and
determine that the RRC state of the UE has changed based on the obtained information about the RRC state of the UE.

19. The UE of claim 18, wherein the obtained information about the RRC state of the UE comprises one or more of:
current RRC state information; and
historical RRC state information.

20. The UE of claim 15, wherein the processing circuitry is further configured to:
determine, based on whether the one or more criteria are satisfied, whether to remain in the normal measurement mode or enter the relaxed measurement mode after the period of time.

* * * * *